United States Patent
Mirghni et al.

(10) Patent No.: US 12,431,301 B1
(45) Date of Patent: Sep. 30, 2025

(54) POLYANILINE-IRON (PANI/Fe) BASED HYBRID SUPERCAPACITOR AND A METHOD OF PRODUCING THE PSEUDOCAPACITIVE ELECTRODE THEREOF

(71) Applicant: King Fahd University of Petroleum and Minerals, Dhahran (SA)

(72) Inventors: Abdulmajid Abdallah Mohamed Mirghni, Dhahran (SA); Md. Abdul Aziz, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/220,367

(22) Filed: May 28, 2025

(51) Int. Cl.
*H01G 11/48* (2013.01)
*H01G 11/04* (2013.01)
*H01G 11/24* (2013.01)
*H01G 11/34* (2013.01)
*H01G 11/46* (2013.01)
*H01G 11/86* (2013.01)

(52) U.S. Cl.
CPC ............ *H01G 11/48* (2013.01); *H01G 11/04* (2013.01); *H01G 11/24* (2013.01); *H01G 11/34* (2013.01); *H01G 11/46* (2013.01); *H01G 11/86* (2013.01)

(58) Field of Classification Search
CPC ........ H01G 11/86; H01G 11/34; H01G 11/24; H01G 11/04; H01G 11/46; H01G 11/48
See application file for complete search history.

(56) References Cited

U.S. PATENT DOCUMENTS

| | | |
|---|---|---|
| 2010/0151328 A1 | 6/2010 | Gadkaree et al. |
| 2020/0194189 A1 | 6/2020 | Mitlin et al. |
| 2024/0006581 A1 | 1/2024 | Shi et al. |

(Continued)

FOREIGN PATENT DOCUMENTS

| | | | |
|---|---|---|---|
| CN | 102074711 A | * | 5/2011 |
| IN | 2017/11006697 A | | 8/2018 |

OTHER PUBLICATIONS

Prasanna B P et al., Synthesis of polyaniline/ α-Fe2O3 nanocomposite electrode material for supercapacitor applications, Materials Today Communications 12 (2017) 72-78 (Year: 2017).*

(Continued)

*Primary Examiner* — David M Sinclair
(74) *Attorney, Agent, or Firm* — Oblon, McClelland, Maier & Neustadt, L.L.P.

(57) ABSTRACT

A hybrid supercapacitor comprising: an electrolyte; a carbon-based electrode including jute stick activated carbon; and, a pseudocapacitive electrode is described. The pseudocapacitive electrode comprises a first metallic substrate and a composite material disposed on the first metallic substrate. The composite material comprises a matrix of polyaniline (PANI) in which clustered nanorods of a-$Fe_2O_3$ are dispersed. The PANI exhibits an orthorhombic $C_6H_7N$ phase, as identified by X-ray diffraction (XRD) analysis. The a-$Fe_2O_3$ nanorods have a median volume particle size (Dv50) ranging from approximately 10 nanometers (nm) to 1000 nm, as determined using scanning electron microscopy (SEM).

20 Claims, 14 Drawing Sheets

(56) References Cited

U.S. PATENT DOCUMENTS

2024/0150543 A1* 5/2024 Láng .......................... C08J 7/12

OTHER PUBLICATIONS

Ifra Marriam, "Development of High-Performance Lithium-Ion Yarn Batteries", QUT ePrints, 2024, 272 Pages.
Mostafa Kaiyum Sharafat, et al., "A Review on Modified Carbon Cloth-Based Electrode for Supercapacitor", International Journal of Research and Scientific Innovation, vol. 11, Issue 4, Apr. 2024, 13 Pages.

* cited by examiner

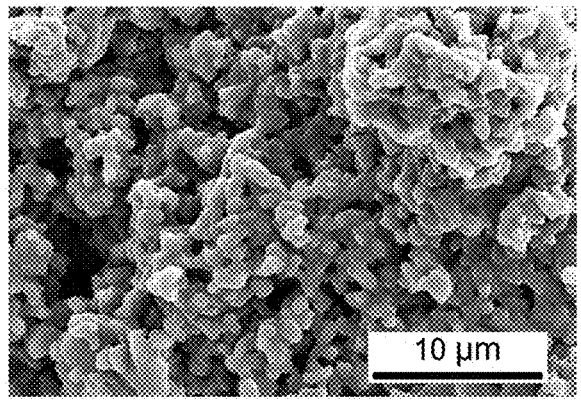
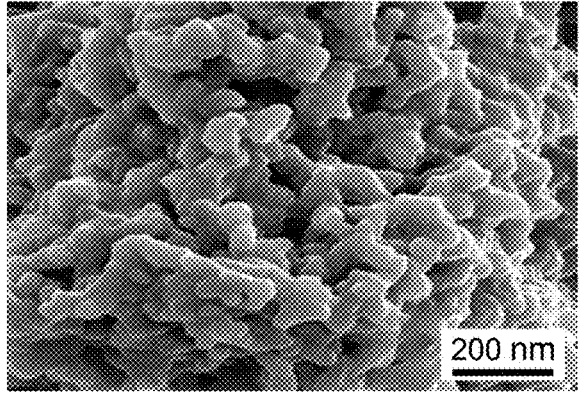
FIG. 3A  FIG. 3B
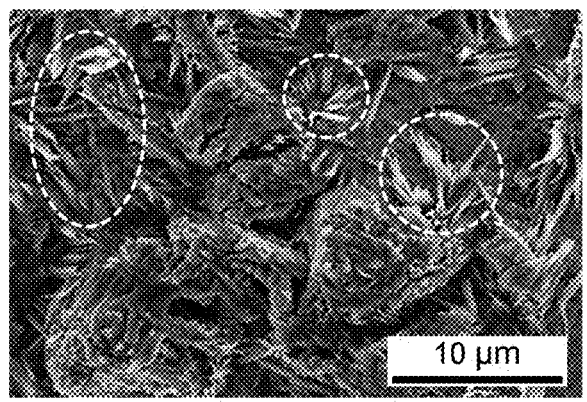
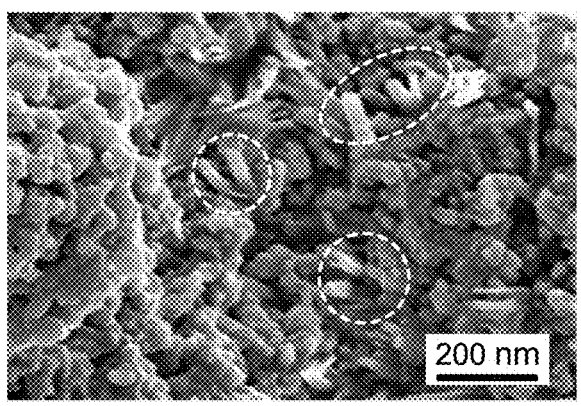
FIG. 3C  FIG. 3D

POLYANILINE-IRON (PANI/Fe) BASED HYBRID SUPERCAPACITOR AND A METHOD OF PRODUCING THE PSEUDOCAPACITIVE ELECTRODE THEREOF

STATEMENT OF ACKNOWLEDGEMENT

Support provided by King Fahd University of Petroleum and Minerals (KFUPM) under Grant No. INHE2311 is gratefully acknowledged.

BACKGROUND

Technical Field

The present disclosure is directed towards a hybrid supercapacitor, and more particularly to a hybrid supercapacitor comprising a polyaniline-iron (PANI/Fe) composite and to a method of producing a pseudocapacitive electrode comprising the composite.

Description of Related Art

The 'background' description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

As global energy demand increases and driven by the need for cleaner and more sustainable energy solutions, there has been a shift from traditional fossil fuels to renewable energy sources such as solar and wind [See: A. N. Abdalla and researchers, *Integration of energy storage system and renewable energy sources based on artificial intelligence: An overview, J. Energy Storage.* 40 (2021) 102811]. Renewable energy sources however have limitations due to their dependence on natural conditions [See: J. R. Miller, P. Simon, *Electrochemical capacitors for energy management, Science* (80), 321 (2008) 651-652]. For example, solar energy is unavailable at night, and wind energy generation is only efficient when wind speeds exceed certain thresholds [See: P. De Jong and researchers, *Solar and wind energy production in relation to the electricity load curve and hydroelectricity in the northeast region of Brazil, Renew. Sustain. Energy Rev.* 23 (2013) 526-535]. Therefore, in order to maximize the utilization of renewable energy sources, researchers are concentrating on developing effective energy storage systems [See: T. Brousse and researchers, *Materials for electrochemical capacitors, Springer Handbooks, Springer Berlin Heidelberg, Berlin, Heidelberg,* 2017: pp. 495-561] of which important examples include rechargeable batteries [See: C. Y. Hsu and researchers, *Rechargeable batteries for energy storage: A review, E-Prime—Adv. Electr. Eng. Electron. Energy.* 8 (2024) 100510] and supercapacitors [See: S. S. Shah and researchers, *Advanced strategies in electrode engineering and nanomaterial modifications for supercapacitor performance enhancement: A comprehensive review, J. Energy Storage.* 79 (2024) 110152]: such batteries and supercapacitors are electrochemical energy storage devices that have been extensively analyzed recently.

The selection of an energy storage device depends on its intended application. For instance, electric vehicles require high specific energy, making rechargeable batteries the preferred option. In contrast, flash cameras demand high specific power delivered quickly, making supercapacitors the ideal choice due to their fast charging and discharging capabilities, high specific power, and longer cycle life. Among the various options, rechargeable batteries and supercapacitors have emerged as key electrochemical energy storage devices. The advancement of supercapacitor technology is crucial for addressing the intermittency issues associated with renewable energy sources, enabling more reliable and efficient energy storage solutions. However, supercapacitors have limitations, such as lower specific energy and smaller voltage windows, which pose significant challenges [See: S. S. Shah and researchers, *Electrochemical synergy and future prospects: Advancements and challenges in MXene and MOFs composites for hybrid supercapacitors, Sustain. Mater. Technol.* 39 (2024) e00814].

Polyaniline (PANI) is a conductive polymer widely used in energy storage devices, sensors and electronic applications on account of its high conductivity, environmental stability, and ease of synthesis. PANI's ability to undergo reversible redox reactions makes it suitable for use in supercapacitors and batteries. However, the low stability, the swelling and shrinking due to Faradaic redox reactions, and the low electrical conductivity of PANI in its base state limit its application in supercapacitors. To address these issues, researchers have investigated the combination of PANI with conductive materials to provide combined materials having improved conductivity and structural integrity. Researchers have also integrated PANI with advanced materials, including metal oxides, to enhance the polymer's stability and electrochemical storage capabilities [See: O. B. Okafor and researchers, *Review of advances in improving thermal, mechanical and electrochemical properties of polyaniline composite for supercapacitor application, Polym. Bull.* 81 (2024) 189-246].

Previously, examinations have been conducted to analyze the electrochemical behavior of supercapacitors utilizing PANI and its nanocomposites. In one such analysis, a hybrid system was fabricated using a PANI fiber array as the positive electrode and a carbon nanotube composite with partially reduced graphene oxide (CNT/PRGO) as the negative electrode. The fabricated hybrid device, which is labelled as PANI@CNT/PRGO, demonstrated promising electrochemical performance, including: 50.2 Farads per cubic centimeter ($F/cm^3$) specific capacitance at a specific current of 60 milliamperes per centimeter ($mAcm^{-1}$); 62.5% capacitance retention; and, 6.97 milliwatt-hours per centimeter ($mWhcm^{-1}$) energy density [See: M. Li and researchers, *Highly stable polyaniline array@ partially reduced graphene oxide hybrid fiber for high-performance flexible supercapacitors,* Carbon N. Y. 203 (2023) 455-461]. A hybrid device combining electric double-layer capacitors and pseudocapacitors may offer enhanced efficiency, delivering high specific energy and power. Asymmetric supercapacitors, with their versatility, are ideal for applications requiring both high specific power and energy [See: M. Li and researchers, *Highly stable polyaniline array@ partially reduced graphene oxide hybrid fiber for high-performance flexible supercapacitors,* Carbon N. Y. 203 (2023) 455-461].

Based on various research evaluations, PANI exhibits several limitations that restrict its use as an effective electrode material for supercapacitors. These limitations include a significant potential drop (IR drop), low operating voltage range, typically between 0 and 0.8 V, and low specific energy values. To overcome these drawbacks, advancements in PANI-based materials, such as metal-ion doping and forming composites with nanomaterials, are essential to improve its electrochemical properties, enhance energy density, and ensure long-term stability for more efficient energy storage applications.

Accordingly, one object of the present disclosure is to provide a hybrid supercapacitor fabricated using PANI and iron (PANI/Fe), that may circumvent the drawbacks and limitations of PANI in itself such as limited specific capacitance, poor cycle stability, slow charge-discharge rates, environmental and safety concerns, of materials and methods known in the art.

SUMMARY

In an exemplary embodiment, a hybrid supercapacitor is described. The supercapacitor comprises: an electrolyte; a carbon-based electrode including jute stick activated carbon; and, a pseudocapacitive electrode. The pseudocapacitive electrode comprises: a first metallic substrate; and, a composite material disposed on the first metallic substrate. The composite material comprises a matrix of polyaniline (PANI) in which are dispersed clustered nanorods of iron oxide (a-$Fe_2O_3$). Further, the PANI comprises an orthorhombic $C_6H_7N$ phase, as determined by X-ray diffraction and the nanorods of a-$Fe_2O_3$ have a median volume particle size (Dv50) of from about 10 nanometers (nm) to about 1000 nm, as determined by scanning electron microscopic (SEM) analysis.

In some embodiments, the jute stick activated carbon has an operational potential window (OPW) of from about –1.1 volts (V) to about 0.0 V versus a silver-silver chloride (Ag/AgCl) reference electrode.

In some embodiments, the first metallic substrate comprises a stainless-steel mesh.

In some embodiments, the composite material is disposed on the first metallic substrate at a substantially uniform thickness.

In some embodiments, the matrix of PANI has a porous sponge-like morphology, as determined by field emission scanning electron microscopy (FESEM).

In some embodiments, the nanorods of a-$Fe_2O_3$ have a median volume particle size (Dv50) of from about 100 nm to about 1000 nm, as determined by scanning electron microscopic (SEM) analysis.

In some embodiments, the pseudocapacitive electrode has a specific capacitance of from about 150 Farads per gram (Fg-1) to about 300 Fg-1, as determined at a specific current of from about 0.5 amperes per gram (Ag-1) to about 10 Ag-1.

In some embodiments, the pseudocapacitive electrode has a specific capacitance of from about 175 Fg-1 to about 300 Fg-1 as determined at a specific current of from about 0.5 Ag-1 to about 10 Ag-1.

In some embodiments, the pseudocapacitive electrode has a charge transfer resistance (RCT) of from about 5 ohms ($\Omega$) to about 15$\Omega$.

In some embodiments, the pseudocapacitive electrode has a charge transfer resistance (RCT) of from about 5 $\Omega$ to about 10$\Omega$.

In some embodiments, the hybrid supercapacitor has, as determined at a specific current of about 1 $Ag^{-1}$, a specific capacity of at least about 100 milliampere-hour per gram ($mAhg^{-1}$).

In some embodiments, the hybrid supercapacitor has, as determined at a specific current of about 1 $Ag^{-1}$, a specific capacity of at least about 125 $mAhg^{-1}$.

In some embodiments, the hybrid supercapacitor has, as determined at a specific current of about 1 $Ag^{-1}$, a specific energy of at least about 40 watt-hour per kilogram ($Whkg^{-1}$).

In some embodiments, the hybrid supercapacitor has, as determined at a specific current of about 1 $Ag^{-1}$, a specific energy of at least about 60 $Whkg^{-1}$.

In some embodiments, the hybrid supercapacitor has, as determined at a specific current of about 1 $Ag^{-1}$, a specific power of at least about 400 watt per kilogram ($Wkg^{-1}$).

In some embodiments, the hybrid supercapacitor has, as determined at a specific current of about 1 $Ag^{-1}$, a specific power of at least about 450 $Wkg^{-1}$.

In another exemplary embodiment, a method of preparing the pseudocapacitive electrode is described. The method comprises: preparing an electrolyte solution in an inert container by dissolving hydrated iron (III) nitrate ($Fe(NO_3)_3 \cdot 9H_2O$) in an aqueous solution of sulfuric acid ($H_2SO_4$) and aniline, wherein the molar ratio of $H_2SO_4$ to aniline is greater than about 10:1; at least partially immersing an anode and a cathode into the contained electrolyte solution, wherein the anode includes the first metallic substrate; and, applying a potential difference between the anode and cathode for a duration sufficient to induce an electric current in the electrolyte solution to electrochemically polymerize the aniline ($C_6H_5NH_2$) to form PANI and to electrodeposit the PANI and a-$Fe_2O_3$ on the immersed anode.

In some embodiments, the molar ratio of $H_2SO_4$ to aniline is from about 50:1 to about 200:1.

In some embodiments, the potential difference is applied using a triangular potential waveform.

In some embodiments, the scan rate of the triangular potential waveform is from about 10 millivolts per second (mV/s) to about 100 mV/s.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3A shows a field emission scanning electron microscopy (FESEM) image of pure PANI at a magnification scale of 10 micrometer (μm), according to certain embodiments.

FIG. 3B shows a field emission scanning electron microscopy (FESEM) micrograph of pure PANI at a magnification scale of 200 nanometers (nm), according to certain embodiments.

FIG. 3C shows a field emission scanning electron microscopy (FESEM) micrograph of PANI/Fe at a magnification scale of 10 μm, according to certain embodiments.

FIG. 3D shows a field emission scanning electron microscopy (FESEM) micrograph of PANI/Fe at a magnification scale of 200 nm, according to certain embodiments.

DETAILED DESCRIPTION

Figure 1A:
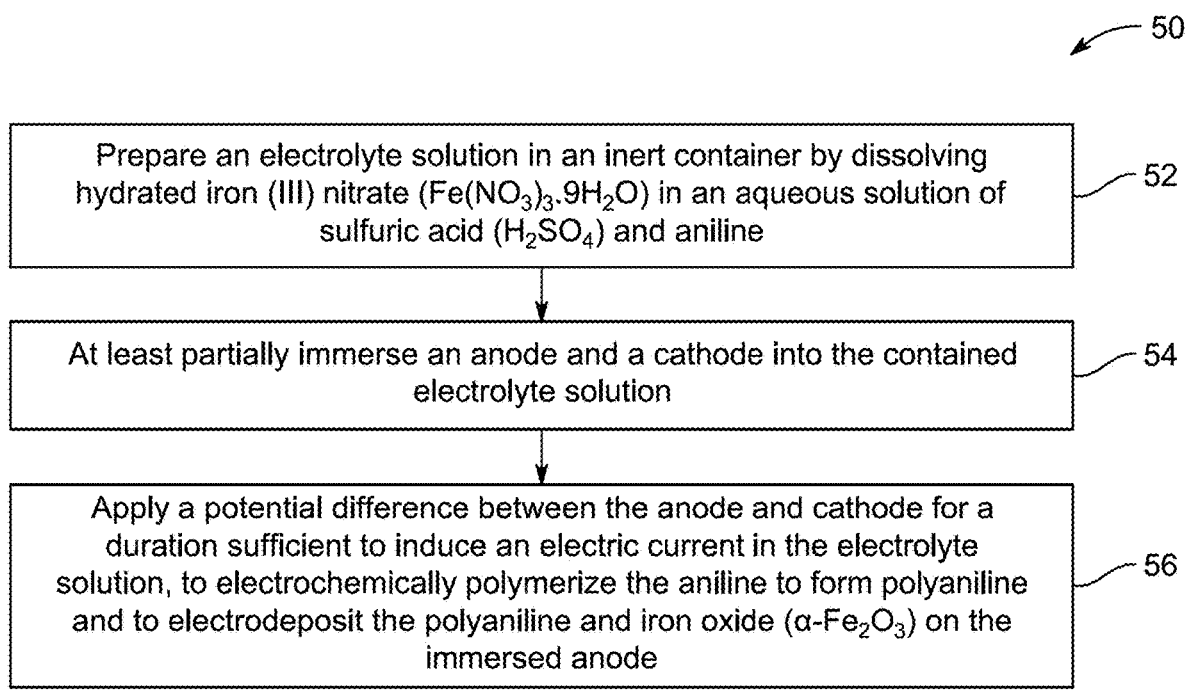
FIG. 1A is a schematic flow chart depicting a method of preparing a pseudocapacitive electrode, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term 'room temperature' refers to a temperature range of 23 degrees Celsius (° C.)+2° C. in the present disclosure. As used herein, 'ambient conditions' means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term 'fraction' refers to a numerical quantity which defines a part up to, but not including, 100 percent or the entirety of the thing in question.

As used herein the term 'disposed' refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein with respect to X-ray diffraction analysis, "JCPDS" denotes the Joint Committee on Powder Diffraction Standards.

An orthorhombic crystalline phase refers to a crystal structure having three mutually perpendicular axes of unequal lengths ($a \neq b \neq c$). This means the crystal lattice forms a rectangular prism where the edges represent the three axes, all intersecting at 90-degree angles ($\alpha=\beta=\gamma=$) 90°.

As used herein, the term 'particle' refers to a small object that acts as a whole unit with regard to its transport and properties. As used herein, 'nanoparticles'-sometimes contracted herein to NPs-refers to particles having a particle size of 1 nanometer (nm) to 1000 nm. Unless a specific (nano) particle morphology is identified for a compound herein, it is envisaged that (nano) particles that are fibrous, acicular, spherical, ellipsoidal, cylindrical, bead-like, cubic or platelet-like may be present alone or in combination. Moreover, it is envisaged that agglomerates of (nano) particles having the same or different morphologies may be present in the composite.

As used herein, the term "nanorod" refers to a nanoparticle having a substantially cylindrical shape.

Unless otherwise stated, the term 'particle size' refers to the largest axis of the particle. In the case of a generally spherical particle, the largest axis is the diameter.

The term 'median volume particle size' (Dv50), as used herein, refers to a particle size corresponding to 50% of the volume of the sampled particles being greater than and 50% of the volume of the sampled particles being smaller than the recited Dv50 value. Similarly, if used, the term 'Dv90' refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term 'nanocomposite' refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein, the term 'porosity' refers to a measure of the void or vacant spaces within a material. As used herein, the term 'pore volume' refers to the total volume of void spaces (pores) within a material that is capable of being filled by a gas or liquid: it is typically expressed in cubic centimeters per gram ($cm^3/g$). As used herein, the term 'pore diameter' refers to the median width or size of the pores (void spaces) within a material, typically measured in nm or angstroms (Å).

As used herein, the term 'activated carbon' references a carbonaceous adsorbent having a developed internal pore structure. The carbon-based electrode including jute stick activated carbon, i.e., activated carbon obtained from jute sticks, of the present disclosure will comprise aggregated particles of activated carbon.

As used herein with respect to the formation of said jute stick activated carbon, 'carbonization' describes a process of taking a precursor material and heating it to an elevated temperature and for an effective amount of time to sufficiently carbonize the mixture to produce a carbonized body. The carbonizing atmosphere should not typically not contain oxygen, as said oxygen will react with carbon and remove material from the carbonized body.

As used herein, 'activation' references a process in which a carbonized precursor is treated with an agent-conventionally an oxidizing agent—to permit the development of a desired pore structure in the activated carbonized body. During activation, some of the carbon can be reacted with the oxidizing agent to form pores of various sizes in the activated carbon.

The term 'isothermal' is used herein to qualify the performance of a stated action-such as a heating step or a cooling step of a process—at a substantially constant temperature.

As used herein, the term 'ultrasonication' or 'sonication' refers to the process in which sound waves are used to agitate particles in a solution. Specifically, the term "ultrasonication" refers to irradiation with ultrasonic waves having a frequency of at least 20 KHz. Without intention to limit the present disclosure, ultrasonication may be performed using an ultrasonic bath or an ultrasonic probe.

As used herein, 'comminuting' refers to process of reducing the average size of solid materials into smaller particles, by crushing, grinding, cutting, vibrating, or other processes.

The term "polar solvent" as used herein refers to a solvent having a dielectric constant (8) of more than 5 as measured at 25° C. The determination of dielectric constant (8) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

Water, for use as a (co-) solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

As used herein, the term "metallic material" means a pure metal, a metal alloy or a metal composite. As used herein, the term "alloy" refers to a substance composed of two or more metals or of a metal and a non-metal which have been intimately united, usually by being fused together and dissolved in each other when molten. The term "X alloy" therefore denotes an alloy of which the metal X is the majority constituent component and wherein X will generally comprise at least 50 wt. %—more typically at least 60 wt. % or at least 70 wt. %—of the alloy, on a metals basis.

As used herein, the term "monomer" refers to a substance that can undergo a polymerization reaction to contribute constitutional units to the chemical structure of a polymer. The term "monomer" herein encompasses macromonomers which, in accordance with IUPAC Gold Book are polymeric or oligomeric molecules possessing at least one reactive functional group: the macromonomer participates in a polymerization reaction and contributes a single monomer unit to the chain of the product polymer.

The term "polymer" as used herein, refers to a compound prepared by polymerizing monomers, whether of the same or a different type, that in polymerized form provide the recurring units that make up a polymer. The generic term "polymer" thus embraces both homopolymers and copolymers. The term "copolymer" as used herein is intended to denote a polymer having two or more different monomer units. The copolymer may, in certain embodiments, be a terpolymer with three or more different monomer units, or have four or more different monomer units. Further, copolymers of the present disclosure may be a random copolymer, a gradient copolymer, or a block copolymer formed by a controlled polymerization process.

The term "electrically conductive" as used herein references materials which have a bulk resistivity of less than 10 ohm-cm, in particular less than 1.0 ohm-cm or less than 0.1 ohm-cm. The term "electrically non-conductive" as used herein references a substrate having a volume electrical conductivity of less than 1 $Sm^{-1}$, typically less than $1\times10\text{-}5$ $Sm^{-1}$ or less than $1\times10\text{-}8$ $Sm^{-1}$.

The term "electrochemical capacitor" refers to a device, component or element for storing electrical energy which comprise two electrodes in contact with an electrolyte, which electrodes may, in some embodiments, be separated by an ion permeable separator. A Helmholz double layer forms at the interface of each electrode with the electrolyte.

In the case of an electrochemical capacitor, the term "electrode" refers to the electrically conductive components which are either the cathode or the anode, and which may (or may not) also be electrochemically active. Depending upon whether the electrochemical device is consuming or providing electrical power, the cathode and anode may be either a positive terminal or a negative terminal. For example, when a battery is discharging, the cathode is the positive terminal of the battery, while the anode is the negative terminal of the battery. Conversely, when a battery is recharging, the cathode is the negative terminal of the battery, while the anode is the positive terminal of the battery.

The term "faradaic reaction" means an electrochemical reaction in which a material is oxidized or reduced.

As used herein, the term 'hybrid supercapacitor' refers to an energy storage device that combines both electrochemical capacitive and pseudocapacitive materials, typically consisting of a combination of a high surface area carbon-based material (for the electric double layer capacitance) and a material capable of fast reversible faradaic reactions (for pseudocapacitance), resulting in enhanced energy and power densities compared to conventional supercapacitors.

As used herein, the term 'operational potential window' refers to the range of voltages within which an electrochemical device, such as a supercapacitor or battery, can operate effectively without degradation or failure, typically defined between the minimum and maximum voltages that the device can safely tolerate during charging and discharging cycles.

As used herein, the term 'pseudocapacitive electrode' refers to an electrode material that stores charge through reversible faradaic reactions, involving electron transfer between the electrode and electrolyte, in addition to the typical electric double-layer capacitive mechanism, providing higher specific capacitance and energy density compared to purely electrostatic capacitors.

As used herein, the term 'capacitance' refers to the capability of a material/device to store electric charge.

As used herein, the term 'specific capacitance' refers to the amount of charge a material can store per unit mass, typically expressed in Farads per gram ($Fg^{-1}$). It is a measure of the capacitance of an electrode material and is determined by its ability to store charge during charging and discharging cycles in supercapacitors or similar energy storage devices.

As used herein, the term 'charge transfer resistance (Rcr)' refers to the resistance encountered by the flow of charge at the interface between the electrode and the electrolyte in an electrochemical system. It is an important parameter in evaluating the efficiency of electron transfer during charge-discharge processes in energy storage devices, such as supercapacitors and batteries. A lower Rcr typically indicates better electrochemical performance and faster charge/discharge rates.

As used herein, the term 'specific current' refers to the current applied per unit mass of the electrode material during electrochemical testing or operation. It is typically expressed in units of amperes per gram ($Ag^{-1}$) and is used to evaluate the performance of energy storage devices, such as supercapacitors or batteries, by providing a measure of the current density relative to the mass of the active material in the electrode. Specific current is important for assessing the charge-discharge efficiency and power handling capabilities of these devices.

As used herein, the term 'specific capacity' refers to the amount of electric charge a material can store per unit mass, typically expressed in milliampere-hours per gram ($mAhg^{-1}$) or coulombs per gram ($Cg^{-1}$). It is a key parameter in evaluating the performance of energy storage devices such as supercapacitors or batteries, indicating how much energy can be stored and released by the material during charge-discharge cycles.

As used herein, the term 'specific energy' refers to the amount of energy stored or delivered by a material or device per unit mass, typically expressed in watt-hours per kilogram ($Whkg^{-1}$) or joules per gram ($Jg^{-1}$). It is a critical parameter for evaluating the performance of energy storage devices, such as batteries and supercapacitors, indicating how much energy can be extracted from the device for a given weight.

As used herein, the term 'specific power' refers to the rate at which energy is delivered or extracted from a material or device per unit mass, typically expressed in watts per kilogram ($Wkg^{-1}$). It measures how quickly a device can deliver power relative to its weight, and is an important parameter in evaluating the performance of energy storage systems, such as supercapacitors or batteries, in high-power applications.

The term "electrolyte" is used herein in accordance with its standard meaning in the art as a substance containing free ions which can conduct electricity by displacement of charged carrier species. The term is intended to encompass molten electrolytes, liquid electrolytes, semi-solid electrolytes and solid electrolytes wherein at least one of the cationic or anionic components of their electrolyte structure is essentially free for displacement, thus acting as charge carrier. As used herein, the term 'electrolyte solution' refers to a conductive solution that contains ions, which facilitates the movement of charge within an electrochemical cell. As used herein, the term 'potential difference' refers to the difference in electric potential between two points in an electric circuit or system. It is also commonly referred to as voltage and is a measure of the energy required to move a unit charge between the two points. Potential difference drives the flow of electric current and is typically measured in volts (V). In the context of energy storage devices like capacitors or batteries, the potential difference between the electrodes is essential for the charging and discharging processes.

As used herein, the term 'anode' refers to the electrode in an electrochemical cell where oxidation reactions occur. It is the electrode through which electrons flow into the external circuit, and it is typically the negative electrode during discharging in devices like batteries and supercapacitors. In a charging process, the anode becomes the positive electrode. The anode plays a crucial role in energy storage devices by facilitating the flow of charge carriers, such as ions, during electrochemical reactions.

As used herein, the term 'cathode' refers to the electrode in an electrochemical cell where reduction reactions occur. It is the electrode through which electrons flow out of the external circuit, and it is typically the positive electrode during discharging in devices like batteries and supercapacitors. During the charging process, the cathode becomes the negative electrode. The cathode is crucial in energy storage devices as it facilitates the flow of charge carriers, such as ions, during electrochemical reactions.

As used herein, the term 'overpotential' refers to the difference in potential that exists between a thermodynamically determined reduction potential of a half-reaction and the potential at which the redox event is experimentally observed. The term is directly associated with a cell's voltage efficacy. In an electrolytic cell, the occurrence of overpotential implies that the cell needs more energy as compared to that thermodynamically expected to drive a reaction. The quantity of overpotential is specific to each cell design and varies across cells and operational conditions, even for the same reaction. Overpotential is experimentally measured by determining the potential at which a given current density is reached.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopes of iron include $^{54}Fe$, $^{56}Fe$, $^{57}Fe$, and $^{58}Fe$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of this disclosure pertain to a system, device, and method of preparing a hybrid supercapacitor comprising a polyaniline-iron (PANI/Fe) composite. The PANI/Fe composite, created through electrodeposition, significantly enhanced conductivity and capacitance, leading to a hybrid supercapacitor with high power, energy, and durability, showcasing its potential for energy storage applications.

A hybrid supercapacitor is described. The supercapacitor comprises: an electrolyte; a carbon-based electrode comprising jute stick activated carbon; and, a pseudocapacitive electrode. The pseudocapacitive electrode includes: a first metallic substrate; and, a composite material disposed on the first metallic substrate, the composite material including a matrix of polyaniline in which are dispersed clustered nanorods of iron oxide (a-$Fe_2O_3$) wherein: the polyaniline includes an orthorhombic $C_6H_7N$ phase, as determined by X-ray diffraction; and, the nanorods of a-$Fe_2O_3$ have a median volume particle size (Dv50) of from about 10 to about 1000 nanometers (nm), as determined by scanning electron microscopic (SEM) analysis.

In an embodiment, the electrolyte comprises sulfuric acid ($H_2SO_4$) at a concentration of from about 0.05 to about 5 molars (M), for example from about 0.1 to about 4.5 M, from about 0.5 to about 4.0 M, from about 1.0 to about 3.5 M, from about 1.5 to about 3.0 M, or from 2.0 to 2.5 M. In a preferred embodiment, the electrolyte is 1 M $H_2SO_4$.

In alternate embodiments, the electrolyte may be comprise at least one compound selected from the group consisting of phosphoric acid, nitric acid, potassium hydroxide, sodium hydroxide, sodium sulfate, potassium carbonate, tetraethylammonium tetrafluoroborate, lithium perchlorate, acetonitrile, potassium chloride, sodium chloride, magnesium sulfate, calcium chloride, ammonium sulfate, lithium hexafluorophosphate, ethylene carbonate, propylene carbonate, and sodium bis(trifluoromethylsulfonyl)imide.

The carbon-based electrode includes jute stick activated carbon. Jute is a natural fiber mainly grown in Asian countries. It is extracted from the plant by the retting process and has high tensile properties and biodegradability. Jute fiber has been used for packaging applications and has new market opportunities in composites, paper, geotextiles, agrotextiles, and lifestyle products. Activated carbon is a highly porous material which exists in the form of loose powder, particles, or irregular agglomerates.

Without intention to limit the present disclosure, the activated carbon may be obtained from jute sticks by a method comprising: comminuting the jute sticks to form a powder having a particle size of from about 50 mesh to about 300 mesh; and, admixing the powder with solid state potassium hydroxide (KOH) at a ratio by weight of KOH to powder of from about 1:1 to about 5:1; forming a slurry of the obtained mixture in water under stirring for a duration of from about 1 hour to about 5 hours; drying the obtained slurry; deagglomerating the residual solid fraction thereof; and, subjecting the deagglomerated solid fraction to carbonization by heating said fraction under an inert atmosphere at temperature of from about 400° C. to about 1000° C.

The heating step to carbonization may be performed as a singular step or may be performed in multiple stages. For instance, the heating may comprise: a first isothermal heating stage in which the fraction is maintained at a temperature in the range of from about 400° C. to about 600° C. for a duration of from about 0.5 hours to about 2 hours; and, a subsequent second isothermal heating stage in which the fraction is maintained at a temperature in the range of about 750° C. to about 1000° C. for a duration of from about 0.5 hours to about 2 hours. After heating, the method includes cooling and neutralizing the product of said carbonization.

In some embodiments, electrochemical characteristics were evaluated by adopting a 3-electrode setup by connecting a working electrode, a reference electrode, and a counter electrode with a potentiostat.

In some embodiments, jute stick activated carbon has an operational potential window ranging from about −1.1 to about 0.0 V, for example from about −1.0 to about −0.1 V, from about −0.9 to about −0.2 V, from about −0.8 to about −0.3 V, from about −0.7 to about −0.4 V, or from about −0.6 to about −0.5 V versus a silver chloride electrode (Ag/AgCl) reference electrode. In a preferred embodiment, the potential window is from about 0 to about 0.7 V versus an Ag/AgCl reference electrode. A reference electrode is an electrode that has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper (II) sulfate electrode (CSE), Ag/AgCl, a pH-electrode, a palladium-hydrogen electrode, a dynamic hydrogen electrode (DHE), a mercury-mercurous sulfate electrode, mercury/mercuric oxide (Hg/HgO) electrode, or some other type of electrode. In a preferred embodiment, a reference electrode is Ag/AgCl electrode. However, in some embodiments, the electrochemical cell does not include a third electrode.

In some embodiments, the counter electrode is made from a material selected from the group consisting of platinum, gold, and carbon. In some embodiments, the counter electrode may contain an electrically-conductive material such as platinum, platinum-iridium alloy, iridium, titanium, titanium alloy, stainless steel, gold, cobalt alloy, and/or some other electrically-conductive material. The form of the counter electrode may be generally relevant only in that it needs to supply sufficient current to the electrolyte solution to support the current required for the electrochemical reaction of interest. The counter electrode material should thus be sufficiently inert to withstand the chemical conditions in the electrolyte solution, such as acidic or basic pH values, without substantially degrading during the electrochemical reaction. The counter electrode should preferably not leach out any chemical substance that interferes with the electrochemical reaction or might lead to undesirable electrode contamination. In a preferred embodiment, the counter electrode is platinum wire.

The supercapacitor further includes a pseudocapacitive electrode. The pseudocapacitive electrode includes a first metallic substrate, and a composite material disposed on the first metallic substrate. In some embodiments, the composite material is disposed on the first metallic substrate at a substantially uniform thickness. The particles of the composite material should cover at least about 50%, for example at least about 55%, at least about 60%, at least about 65%, at least about 70%, at least about 75%, at least about 80%, at least about 85%, at least about 90%, or at least about 95% of the substrate. In some embodiments, the composite material may be disposed on the surface of the substrate using one of the techniques like the drop-casting method, spray coating, spin coating, dip coating, electrodeposition, physical vapor deposition (PVD), aerosol-assisted chemical vapor deposition (AACVD), or molecular beam epitaxy (MBE).

Exemplary materials for the first metallic substrate, which may be present alone or in combination include, but are not limited to, aluminium foil, copper foil, nickel foam, titanium foil, zinc plate, magnesium sheet, platinum wire, gold plate, silver foil, chromium sheet, tungsten plate, molybdenum sheet, palladium foil, cobalt plate, iron mesh, lead sheet, bismuth plate, indium sheet, tin foil, and gallium plate. In a preferred embodiment, the first metallic substrate comprises or consists of a stainless-steel mesh: in this embodiment, the coated stainless-steel mesh would be the working electrode.

The composite material comprises a matrix of PANI in which clustered nanorods of iron oxide (a-$Fe_2O_3$) are dispersed. The presence of nanorods of iron oxide (a-$Fe_2O_3$) does not preclude the further inclusion of a-$Fe_2O_3$ particles having other morphological shapes, such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures.

In some embodiments, the nanorods of a-$Fe_2O_3$ have a median volume particle size (Dv50) of from about 10 to about 1000 nm, for example from about 50 to about 950 nm, from about 100 to about 900 nm, from about 150 to about 850 nm, from about 200 to about 800 nm, from about 250 to about 750 nm, from about 300 to about 700 nm, from about 350 to about 650 nm, from about 400 to about 600 nm, from about 450 to about 550 nm, or about 500 nm, as determined by scanning electron microscopy (SEM) analysis.

Polyaniline (PANI) is a conductive polymer commonly utilized in energy storage devices, sensors, and electronic applications because of its excellent conductivity, environmental stability, and simple synthesis process. PANI may be synthesized through the oxidation of aniline monomers. Recently, it has garnered significant attention in the energy storage industry due to its potential use as an electrode material [See: M. Beygisangchin and researchers, *Recent progress in polyaniline and its composites; Synthesis, properties, and applications, Eur. Polym. J.* 210 (2024) 112948, the disclosure of which is incoporated herein by reference in its entirety]. PANI is attractive owing to its abundance, cost effectiveness, easy synthetic methods, and higher specific capacitance [See: H. R. Himadri and researchers, *Development of surfactant integrated polyaniline-based electrode material towards supercapacitor application, Colloids Surfaces A Physicochem. Eng. Asp.* 688 (2024) 133545, the disclosure of which is incoporated herein by reference in its entirety].

Herein the PANI includes an orthorhombic $C_6H_7N$ phase, as determined by X-ray diffraction (XRD). In some embodiments, the morphology of the matrix of PANI includes diverse shapes such as cones, cuboidal, pyramidical, cylindrical, wires, crystals, rectangles, triangles, prisms, disks, cubes, ribbons, blocks, beads, discs, barrels, granules, whiskers, flakes, foils, powders, boxes, stars, flowers, polygonal like trigonal, pentagonal, hexagonal, etc., and mixtures thereof. In a preferred embodiment, the matrix of PANI has a porous sponge-like morphology, as determined by field emission scanning electron microscopy (FESEM).

In some embodiments, the pseudocapacitive electrode has a specific capacitance of from about 150 to about 300 $Fg^{-1}$, for example from about 160 to about 290 $Fg^{-1}$, from about 170 to about 280 $Fg^{-1}$, from about 180 to about 270 $Fg^{-1}$, from about 190 to about 260 $Fg^{-1}$, from about 200 to about 250 $Fg^{-1}$, from about 210 to about 240 $Fg^{-1}$, from about 220 to about 230 Fg 1, at a specific current of from about 0.5 to about 10 $Ag^{-1}$, from about 1 to about 9 $Ag^{-1}$, from about 2 to about 8 $Ag^{-1}$, from about 3 to about 7 $Ag^{-1}$, from about 4 to about 6 $Ag^{-1}$, and from about 5 $Ag^{-1}$. In some embodiments, the pseudocapacitive electrode has a specific capacitance ranging from about 175 to about 300 $Fg^{-1}$, for example from about 180 to about 295 $Fg^{-1}$, from about 185 to about 290 $Fg^{-1}$, from about 190 to about 285 $Fg^{-1}$, from about 195 to about 280 $Fg^{-1}$, from about 200 to about 275 $Fg^{-1}$, from about 205 to about 270 $Fg^{-1}$, from about 210 to about 265 $Fg^{-1}$, from about 215 to about 260 $Fg^{-1}$, from about 220 to about 255 $Fg^{-1}$, from about 225 to about 250 $Fg^{-1}$, from about 230 to about 245 $Fg^{-1}$, and from about 235 to about 240 Fg 1 at a specific current of from about 0.5-10 $Ag^{-1}$, for example from about 1 to about 9 $Ag^{-1}$, from about 2 to about 8 $Ag^{-1}$, from about 3 to about 7 $Ag^{-1}$, from about 4 to about 6 $Ag^{-1}$, or about 5 $Ag^{-1}$. In a preferred embodiment, the pseudocapacitive electrode has a specific capacitance of about 278.7 $Fg^{-1}$, at a specific current of about 1 $Ag^{-1}$.

In some embodiments, pseudocapacitive electrode has a Rcr of from about 5 to about 15Ω, from about 6 to about 14Ω, from about 7 to about 13Ω, from about 8 to about 12Ω, from about 9 to about 11Ω, or about 10Ω. In some embodiments, pseudocapacitive electrode has a Rcr of from about 5 to about 10Ω, for example from about 6 to about 9Ω, or from about 7-8Ω.

In some embodiments, the hybrid supercapacitor, as determined at a specific current of about 1 $Ag^{-1}$, has a specific capacity of at least about 100 $mAhg^{-1}$, for example at least 110 $mAhg^{-1}$, at least about 120 $mAhg^{-1}$, at least about 130 $mAhg^{-1}$, from about 130 to about 135 $mAhg^{-1}$. In a preferred embodiment, hybrid supercapacitor has a specific capacity of 131.2 $mAhg^{-1}$ at a specific current of about 1 $Ag^{-1}$.

In some embodiments, the hybrid supercapacitor has, as determined at a specific current of about 1 $Ag^{-1}$, a specific energy of at least about 40 $Whkg^{-1}$, for example at least about 45 $Whkg^{-1}$, at least about 50 $Whkg^{-1}$, at least about 55 $Whkg^{-1}$, at least about 60 $Whkg^{-1}$, or from about 60 to about 65 $Whkg^{-1}$. In some embodiments, the hybrid supercapacitor has, as determined at a specific current of about 1 $Ag^{-1}$, a specific energy of from about 60 to about 65 $Whkg^{-1}$, of example from about 61 to about 64 $Whkg^{-1}$, from about 61 to about 63 $Whkg^{-1}$, from about 62 to about 63 $Whkg^{-1}$. In a preferred embodiment, the hybrid supercapacitor has a specific energy of 62.91 $Whkg^{-1}$ at a specific current of about 1 $Ag^{-1}$.

In some embodiments, the hybrid supercapacitor has, as determined at a specific current of about 1 $Ag^{-1}$, a specific power of at least about 400 $Wkg^{-1}$, for example at least about 410 $Wkg^{-1}$, or at least about 420 $Wkg^{-1}$. In some embodiments, the hybrid supercapacitor has, as determined at a specific current of about 1 $Ag^{-1}$, a specific power of from about 430 to about 500 $Wkg^{-1}$, for example from about 440 to about 500 $Wkg^{-1}$, from about 450 to about 500 $Wkg^{-1}$, from about 460 to about 500 $Wkg^{-1}$, from about 470 to about 500 $Wkg^{-1}$, or from about 475 to about 500 $Wkg^{-1}$. In a preferred embodiment, hybrid supercapacitor has a specific power of 479.5 W/kg at a specific current of about 1 A/g.

FIG. 1A illustrates a schematic flow chart of a method 50 of preparing of preparing the pseudocapacitive electrode. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes preparing an electrolyte solution in an inert container by dissolving hydrated iron (III) nitrate ($Fe(NO_3)_3 \cdot 9H_2O$) in an aqueous solution of $H_2SO_4$ and aniline. In alternate embodiments, iron salt may include, but is not limited to, ferric chloride, ferric sulfate, ferric nitrate, ferric bromide, ferric iodide, ferric acetate, ferric oxalate, ferric phosphate, ferric citrate, ferric tartrate, ferric carbonate, ferric thiocyanate, ferric pyrophosphate, ferric ammonium sulfate, ferric chloride hexahydrate, ferric gluconate, hydrates of said salts, or mixtures thereof. The dissolution may be carried out by manually, via stirring or via sonication. The dissolution of the salt is carried out until the particles thereof are fully dissolved in the solvent until a homogenous solution is obtained. In a preferred embodiment, the solution is dissolved via sonication, in particular via ultrasonication.

In some embodiments, the molar ratio of $H_2SO_4$ to aniline in step 52 is greater than about 10:1, for example at least about 20:1, at least about 30:1, at least about 40:1, at least about 50:1, at least about 60:1, at least about 70:1, at least about 80:1, at least about 90:1, or at least about 100:1. In some embodiments, the molar ratio of $H_2SO_4$ to aniline is from about 50:1-200:1, for example about 60:1-190:1, about 70:1-180:1, about 80:1-170:1, about 90:1-160:1, about 100:1-150:1, about 110:1-140:1, or about 120:1-130:1. In a preferred embodiment, the molar ratio of $H_2SO_4$ to aniline is 96:1.

At step 54, the method 50 includes at least partially immersing an anode and a cathode into the contained electrolyte solution. Exemplary materials from which the anode of the electrodeposition cell may be formed may include, but are not limited to, gold wire, graphite rod, titanium mesh, titanium rod, nickel wire, stainless steel plate, stainless steel mesh, iridium oxide-coated titanium, ruthenium oxide-coated titanium, tantalum rod, carbon fiber, lead dioxide plate, tin oxide-coated titanium, antimony-doped tin oxide, cobalt oxide-coated substrates, conductive diamond, silver wire, palladium rod, zinc plate, copper mesh, and manganese dioxide-coated substrates. In a preferred embodiment, the anode of the electrodeposition cell comprises or consists of a stainless steel mesh.

In some embodiments, the cathode of the electrodeposition cell may include, but is not limited to, graphite plate, carbon paper, gold foil, nickel foam, titanium foil, copper plate, silver mesh, stainless steel foil, stainless steel mesh, aluminium plate, zinc plate, lead plate, molybdenum rod, tungsten plate, carbon nanotube-coated substrates, graphene-coated electrodes, palladium plate, tin foil, cobalt-coated substrates, iron plate, and conductive polymer-coated electrodes. In a preferred embodiment, the cathode comprises or consists of a stainless steel mesh.

At step 56, the method 50 includes applying a potential difference between the anode and cathode for a duration sufficient to induce an electric current in the electrolyte solution, to electrochemically polymerize the aniline to form PANI and to electrodeposit the PANI and a-$Fe_2O_3$ on the immersed anode.

The potential difference is applied using a triangular potential waveform. In some embodiments, the scan rate of the triangular potential waveform is from about 10-100 mV/s, for example from about 20-90 mV/s, from about 30-80 mV/s, from about 40-70 mV/s, or from about 50-60 mV/s. In a preferred embodiment, the scan rate of the triangular potential waveform is about 50 mV/s.

To maintain uniform concentrations and/or temperatures of the electrolyte solution, the electrolyte solution may be stirred or agitated for the duration of application of the potential difference between the anode and cathode. The stirring or agitating may be done intermittently or continuously. This stirring or agitating may be done by a magnetic stir bar, a stirring rod, an impeller, a shaking platform, a pump, a sonicator, a gas bubbler, or some other device.

The progress of the polymerization reaction of step 56 can be monitored by known techniques of which mention may be made of 1H NMR, Fourier Transform Infrared Spectroscopy, Ultra Performance Liquid Chromatography (UPLC), gas chromatography or thin layer chromatography (TLC). Upon the attainment of sufficient polymerization of the aniline and sufficient electrodeposition of the formed PANI and a-$Fe_2O_3$ on the immersed anode, the anode is withdrawn from the electrochemical cell. The so-coated anode may then be further processed to render it suitable for inclusion in the hybrid supercapacitor of the present disclosure. Such further processing treatments can be performed in a single or multi-stage manner and may conventionally include one or more of: rinsing with a cleaning solvent, such as acetone, carbon tetrachloride or trichloroethylene; water rinsing, preferably with deionized or demineralized water; and, rinsing with an acidic solution, for instance a sulfuric acid solution. A drying step should be performed after the final applied rinsing step: where multiple rinsing steps are performed, it is not precluded that a drying step may be performed subsequent to a given ringing step. Exemplary drying conditions include a temperature of from about 50 to about 100° C., for instance from about 60 to about 90° C. or about 70 to about 90° C.

EXAMPLES

The following examples demonstrate a hybrid supercapacitor fabricated using a polyaniline-iron (PANI/Fe) composite and a method of producing the pseudocapacitive electrode thereof. The examples are provided solely for illustration and are not to be construed as limitations of the present disclosure, as many variations thereof are possible without departing from the spirit and scope of the present disclosure.

Example 1: Methods and Materials

The chemicals pertaining to the present disclosure were obtained from in their pure form from commercial sources. The essential materials include sulfuric acid ($H_2SO_4$), aniline monomer, and steel mesh. All these materials were sourced from commercial suppliers.

Example 2: Electrode Fabrication

Figure 1B:
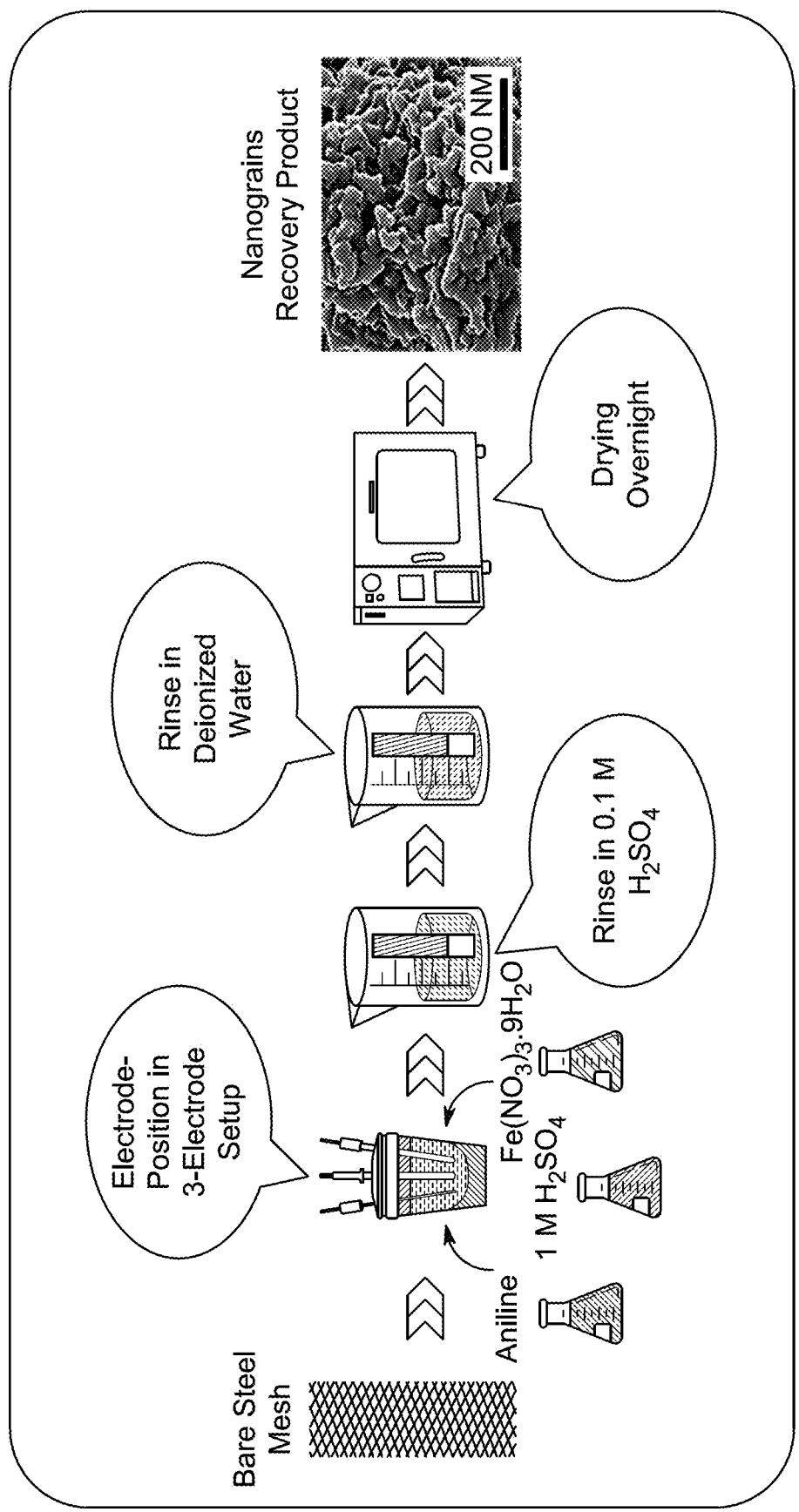
FIG. 1B is a schematic illustration for the processes involved in producing a polyaniline iron (PANI/Fe) electrode material, according to certain embodiments.

To prepare a homogeneous solution of pure polyaniline (PANI), 1.25 milliliters (mL) of 0.5 molar (M) aniline was combined with 60 mL of 1 M $H_2SO_4$ and sonicated until uniform. A 250-mesh steel was thoroughly cleaned, first by rinsing with ethanol, then sonicated for 15 minutes (min), followed by rinsing with deionized water and another 15-min sonication to remove surface impurities. The cleaned steel mesh was dried for 6 hours and used as a substrate for electrodeposition. Electrodes measuring 1 centimeter square ($cm^2$) were cut from each prepared mesh. The PANI/iron (PANI/Fe) solution experienced a similar process, augmented by the inclusion of 20 milligrams (mg) of iron (III) nitrate nonahydrate ($Fe(NO_3)$ $3.9H_2O$). Electrochemical deposition of both PANI and PANI/Fe was conducted individually on respective electrodes via cyclic voltammetry (CV) in a 10 mL of laboratory beaker. Deposition parameters included 25 cycles, a scan rate of 50 millivolts per second (mV/s), and a 1-volt operating potential window (OPW). The three electrodes were set up as follows: a platinum wire counter electrode, a silver chloride electrode (Ag/AgCl) reference electrode, and a working electrode, which was a coated steel mesh. During the electrodeposition process, verdant-hued layers of PANI formed on the surfaces of the working electrodes. After deposition, the electrodes were rinsed with a solution of 0.1 M $H_2SO_4$ and deionized water, then dried overnight in an air oven at 60 degrees Celsius (° C.). The experimental procedures for synthesizing the PANI/Fe electrode material were illustrated in a schematic diagram. Pure PANI was synthesized using the same steps outlined in the schematic, with the only difference being the omission of iron nitrate. A schematic of the PANI/Fe electrode material fabrication process is shown in FIG. 1B.

Example 3: Materials Characterization

Several analytical methods were employed to investigate the samples' electrochemical characteristics, morphology, and crystalline structure. X-ray diffraction (XRD) measurements were conducted using a Rigaku Miniflex-II diffractometer to analyze the structural properties. The diffractometer was outfitted with Cu-Kα radiation, which had a wavelength of 0.15416 nanometers (nm) and operated at 10 kilovolts (kV) and 30 milliamperes (mA) when it was operating. Both the morphology and the elemental composition were examined using energy-dispersive X-ray analysis (EDX) in conjunction with field emission scanning electron microscopy (FESEM). An Oxford Instruments X-Max detector, coupled to the FESEM system and operating at an accelerating voltage of 2.0 kV, was used for these analyses. Electrochemical characteristics were evaluated by adopting a 3-electrode setup in a 1 M solution of $H_2SO_4$ in order to conduct the experiment. This apparatus consisted of a counter electrode (Pt wire) in addition to a reference electrode (Ag/AgCl saturated with 3 M potassium chloride (KCl) throughout the experiment. Electrochemical impedance spectroscopy (EIS), galvanostatic charge-discharge (GCD), and cyclic voltammetry (CV) were the three types of electrochemical analyses carried out. The voltage ranging from 0 volt (V) to 0.7 V relative to the Ag/AgCl reference electrode was used for both the CV and GCD tests. Electrochemical impedance spectroscopy (EIS) measurements were carried out using a CHI 760E potentiostat, with an open circuit voltage of 0 V and a frequency range from 100 hertz (Hz) to 1 megahertz (MHz). An exhaustive investigation of the characteristics of the PANI and PANI/Fe nanocomposite materials was made possible by the usage of structural, morphological, and electrochemical characterization techniques.

Equations (1) and (2) were applied for the computing of specific capacitance in Farads per gram ($Fg^{-1}$) as well as specific capacity in milliampere-hours per gram ($mAhg^{-1}$) [See: A. A. Mirghni and researchers, *Electrochemical analysis of Na-Ni bimetallic phosphate electrodes for supercapacitor applications*, RSC Adv. 9 (2019) 25012-25021, the disclosure of which is incoporported herein by reference in its entirety].

$$C_S = \frac{i\Delta t}{m\Delta v} \quad (1)$$

$$Q_S = \frac{I_d \Delta t}{3.6} \quad (2)$$

In the given expression: i indicates the current; $\Delta t$ denotes the discharging time; m symbolizes the mass of the active electrode material; and, $I_d$ refers to the specific current.

In the full asymmetric supercapacitor, a charge balance is necessary due to the differing performances of PANI/Fe and jute activated carbon (JAC). To ensure equal charge distribution between the negative and positive electrodes, the following formula was applied, as shown in Equation (3) [See: D. J. Tarimo and researchers, *Recycling of biomass wastes from amarula husk by a modified facile economical water salt method for high energy density ultracapacitor* application, *J. Energy Storage.* 53 (2022) 105166, the disclosure of which is incorporated herein by reference in its entirety].

$$\frac{m_{(+)}}{m_{(-)}} = \frac{C_{S(-)}\Delta v_{(-)}}{C_{S(+)}\Delta v_{(+)}} \quad (3)$$

The symbols m(+) and m(−) denotes the active masses of the positive and negative electrodes, while Cs(+) and Cs(−) signify the specific capacitance values of the positive and negative electrodes, respectively. Additionally, the OPWs of the positive electrode are denoted by Av(+) and the negative electrode by Av(−).

In a coin cell arrangement, an asymmetrical cell was constructed with PANI/Fe serving as the positive electrode and JAC as the negative electrode. The electrolyte in this system was 1 M $H_2SO_4$, and filter paper served as a separator. The performance of supercapacitor was evaluated based on two essential factors: specific energy (Ed); and, specific power (Pd). The below formulas were used to calculate Ea and Pa of the asymmetric supercapacitor device [See: A. A. Mirghni and researchers, *Electrochemical analysis of $Co_3(PO_4)_2$: $4H_2O$/graphene foam composite for enhanced capacity and long cycle life hybrid asymmetric capacitors, Electrochim. Acta.* 283 (2018) 374-384, the disclosure of which is incoroporated herein by reference in its entirety].

$$E_d = \frac{i}{3.6m}\int Vdt \quad (4)$$

$$P_d = 3600\frac{E_d}{\Delta t} \quad (5)$$

Where i (mA) signifies current, m (mg) denotes active mass, At(s) represents discharge time and f Vdt denotes the area under the curve of the supercapacitor's discharge time.

Results

Figure 2A:
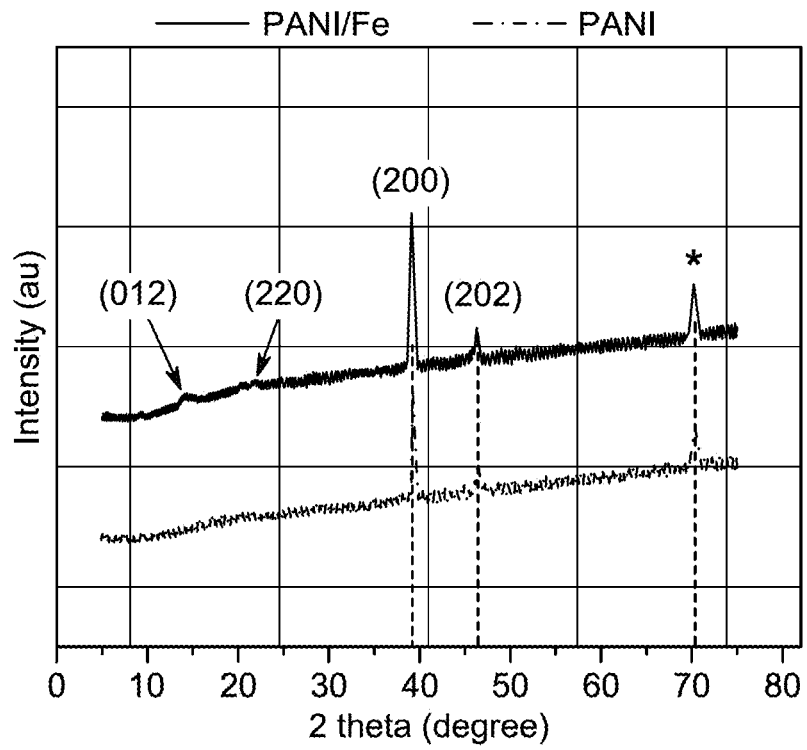
FIG. 2A shows X-ray diffraction (XRD) patterns of PANI and a PANI/Fe composite, according to certain embodiments.

The XRD analysis revealed the structural and crystalline phases of the electrode materials. The XRD patterns for pure PANI and PANI/Fe, were measured across a range from 2θ=0° to 2θ=80°, as shown in FIG. 2A. Two distinct and intense diffraction peaks were observed for PANI and PANI/Fe at 2θ=~ 39° and 2θ=~ 46°, corresponding to the (200) and (202) Miller indices, respectively. These diffraction peaks were consistent with the orthorhombic phase of aniline ($C_6H_7N$), as verified with JCPDS Card No. 00-053-1718, the disclosure of which is incorporated herein by reference in its entirety [See: A. V. Kadam and researchers, *Polyaniline globules as a catalyst for WO3 nanoparticles for supercapacitor application, Mater. Res. Express.* 5 (2018) 085036 the disclosure of which is incoroporated herein by reference in its entirety]. The asterisk (*) marks the diffraction peak corresponding to the steel mesh substrate [See: C. H. Sha and researchers, *Microstructure and surface treatment of 304 stainless steel for electronic packaging, J. Electron. Packag. Trans. ASME.* 133 (2011) the disclosure of which is incoroporated herein by reference in its entirety]. PANI/Fe displayed two additional peaks over the pure PANI, confirming the presence of iron (Fe). The diffraction peaks at 2θ=~ 14° and 2=~ 22° were attributed to a-iron oxide, arising from the presence of $Fe(NO_3)$ $3.9H_2O$ in the composition.

Figure 2B:
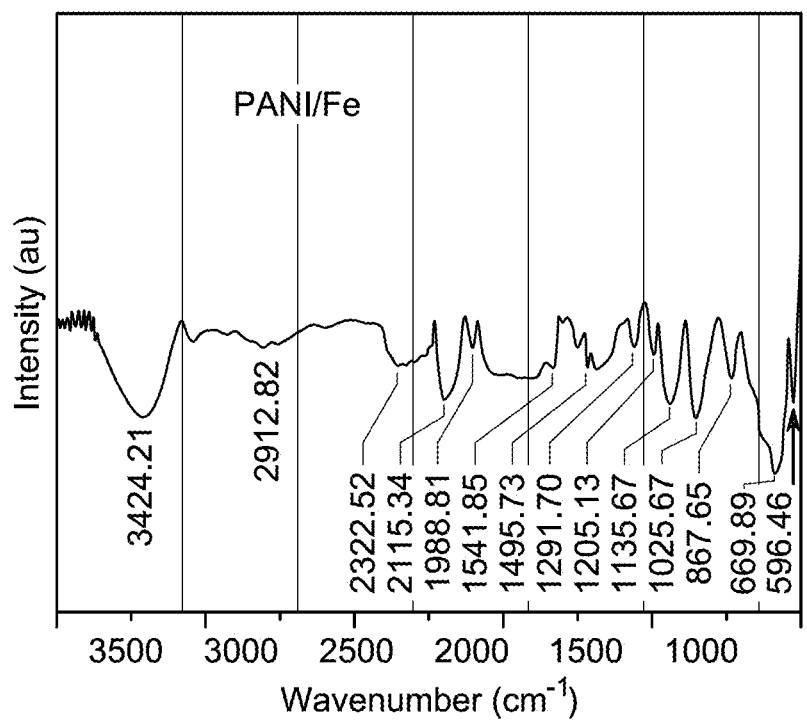
FIG. 2B shows a Fourier transform electron microscopy (FTIR) spectrum of PANI/Fe, according to certain embodiments.

Fourier transform infrared spectroscopy (FTIR) was employed to analyze the surface functional groups present on the PANI/Fe electrode material. The FTIR results of PANI/Fe nanocomposite are shown in FIG. 2B. Five primary characteristic peaks were identified for PANI, appeared at approximately 1541.85 per centimeter ($cm^{-1}$), 1495.73 $cm^{-1}$, 1291.70 $cm^{-1}$, 1135.67 $cm^{-1}$, and 669.89 $cm^{-1}$. The spectral peaks at 1541.85 $cm^{-1}$ and 1495.73 $cm^{-1}$ were assigned to the vibrational and stretching modes of the C=C quinoid and benzenoid rings, respectively. Additionally, the bands at about 1291.70 $cm^{-1}$, 1135.67 $cm^{-1}$, and 669.89 $cm^{-1}$ were assigned to C—N stretching and C—H bending, which reflect in-plane and out-of-plane deformations. Particularly, the presence of the band around 1291.70 $cm^{-1}$ indicates the existence of the conducting protonated form of PANI. At around 867.65 $cm^{-1}$, a peak attributed to the stretching vibration of N=Q=N, with Q representing the quinonoid ring, was observed. Furthermore, a likely Fe-oxide peak, initially ≤550 $cm^{-1}$, shifted to a higher wavenumber of approximately 596.46 $cm^{-1}$, suggesting a robust interaction between Fe and PANI. The slight rEDXhift of PANI may be attributed to interactions between PANI's metallic Fe and nitrogen atoms, on the basis that metallic ions tend to preferentially interact with oxygen-containing functional groups. These observations aligned well with a prior analysis [See: D. Zha and researchers, *Strongly coupled manganese ferrite/carbon black/polyaniline hybrid for low-cost supercapacitors with high rate capability, Electrochim. Acta.* 185 (2015) 218-228, the disclosure of which is incoroporated herein by reference in its entirety].

FESEM micrographs were employed to analyze the morphology of electrochemically synthesized samples of PANI and PANI/Fe.

The images of pure PANI at low and high magnifications, reveal a porous, spongy morphology at the nanoscale, as shown in FIGS. 3A and 3B. FESEM images indicated uniform distribution of the PANI sample across the substrate surface, suggesting successful electrodeposition of PANI onto the substrate.

The high and low-magnification FESEM micrographs of PANI/Fe are shown in FIG. 3C and FIG. 3D, respectively. These images revealed a nanorod morphology, with clusters distributed throughout the samples. These nanorod clusters were identified as Fe cations, indicating a well-dispersed presence of Fe cations within the PANI matrix, which likely contributed to the enhanced electrochemical performance of PANI/Fe.

Figure 4A:
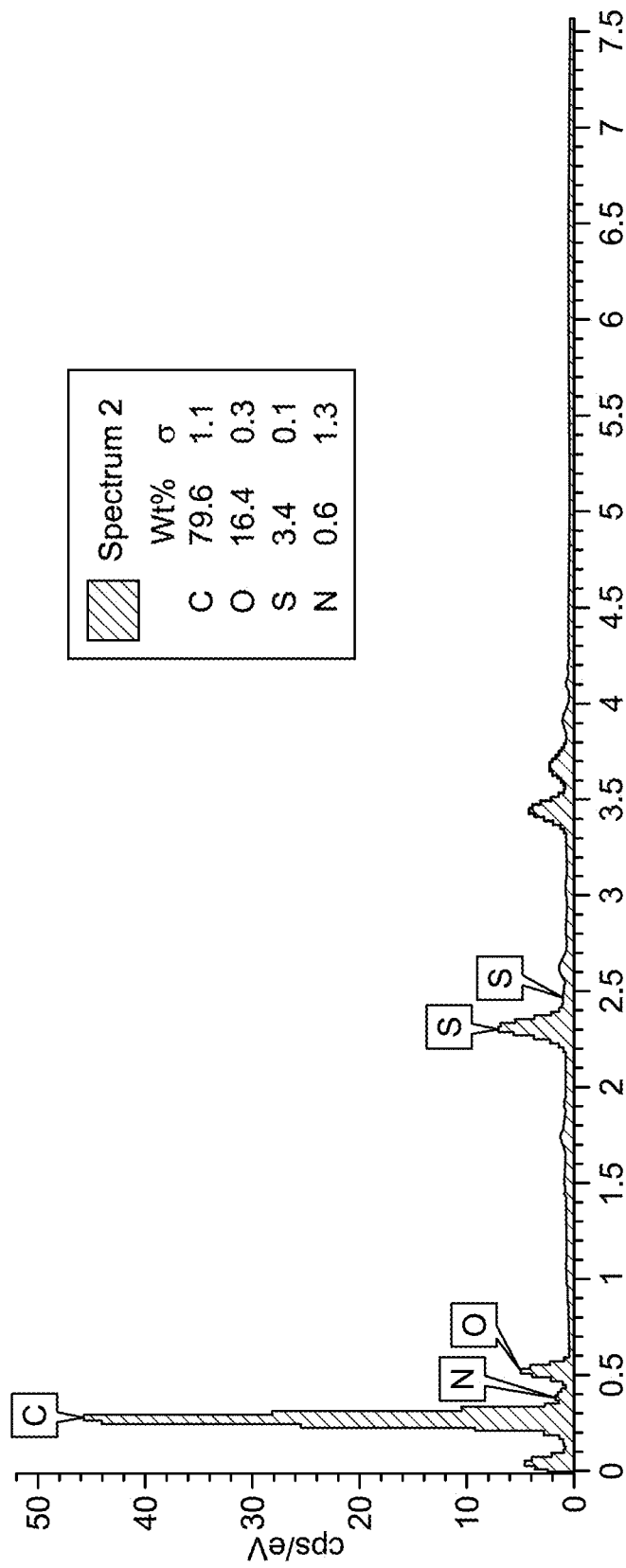
FIG. 4A shows an energy dispersive X-ray spectroscopy (EDX) analysis of pure PANI, according to certain embodiments.
Figure 4B:
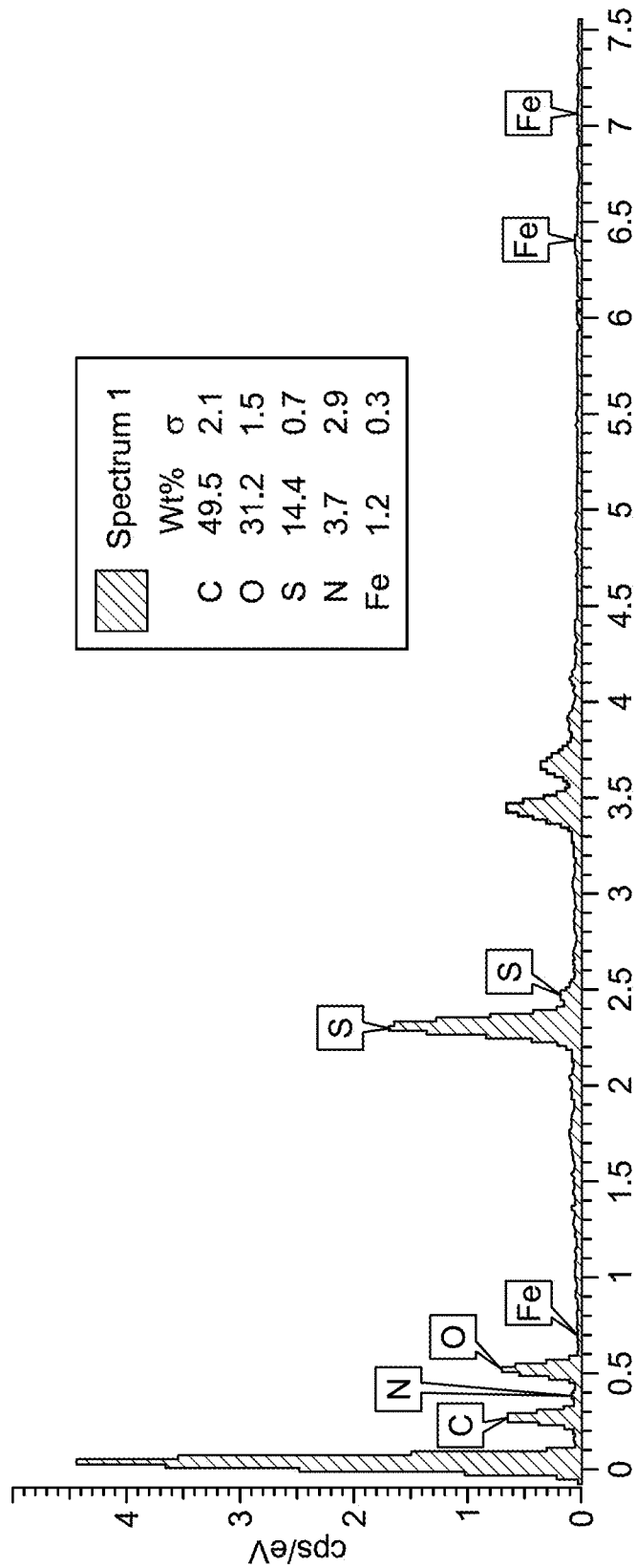
FIG. 4B shows an energy dispersive X-ray (EDX) spectra of a PANI/Fe nanocomposite, according to certain embodiments.
Figure 4C:
FIG. 4C depicts an energy dispersive X-ray (EDX) elemental mapping image of PANI/Fe nanocomposite for carbon (C), according to certain embodiments.
Figure 4D:
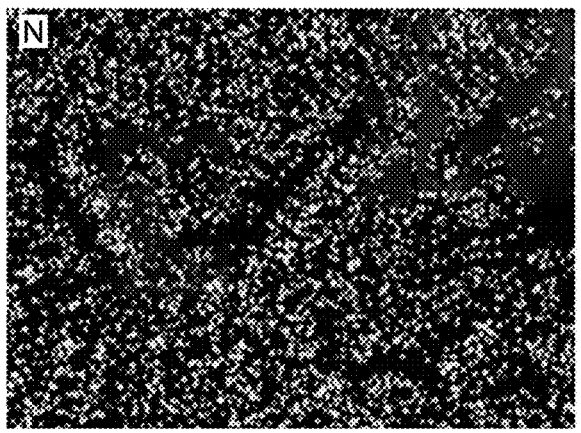
FIG. 4D depicts an energy dispersive X-ray (EDX) elemental mapping image of PANI/Fe nanocomposite for nitrogen (N), according to certain embodiments.
Figure 4E:
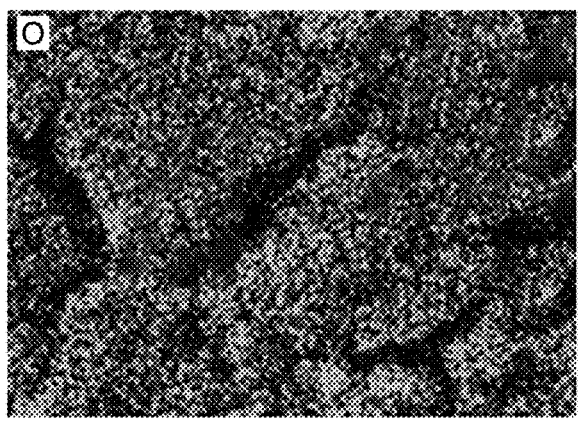
FIG. 4E depicts an energy dispersive X-ray (EDX) elemental mapping image of PANI/Fe nanocomposite for oxygen (O), according to certain embodiments.
Figure 4F:
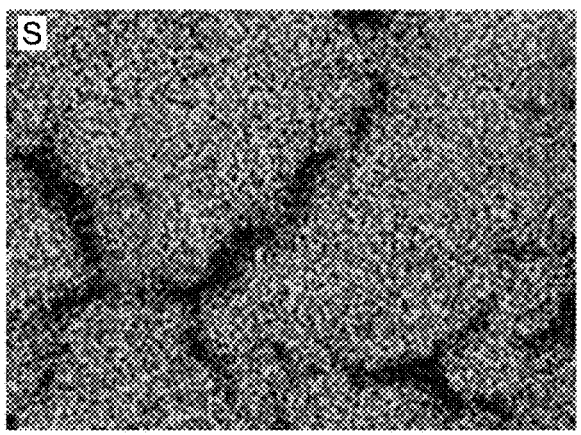
FIG. 4F depicts an EDX elemental mapping image of PANI/Fe nanocomposite for sulfur (S), according to certain embodiments.
Figure 4G:
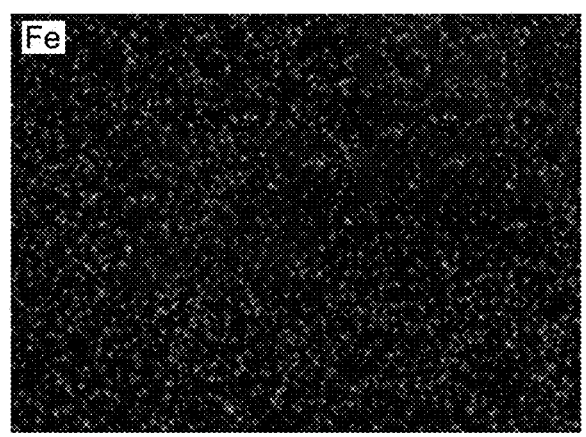
FIG. 4G depicts an EDX elemental mapping image of PANI/Fe nanocomposite for Fe, according to certain embodiments.

To determine the elemental composition, the samples had to be prepared very carefully to avoid any potential interference between the steel mesh substrate and the basic component Fe in the samples. Typically, after depositing the samples on the substrate, the materials were scraped away, dispersed in ethanol using sonication for 20 minutes, and then drop-cast onto the fluorine-doped tin oxide (FTO) glass for measurement. Further, the EDX spectra for both pure PANI and PANI/Fe, revealing the occurrence of elements C, N, S, and O in both samples, were analyzed. EDX spectrum of PANI and PANI/Fe are shown in FIG. 4A-4B. Additionally, the presence of Fe in the PANI/Fe sample arose from the incorporation of iron nitrate during synthesis. The introduction of $H_2SO_4$—as the acid electrolyte during the PANI electrochemical deposition-accounts for the sulfur detected in the elemental analysis, which is more particularly attributed to sulfate ion incorporation.

The insets in FIG. 4A-4B show the map summation spectrum of PANI and PANI/Fe in weight percentage (wt. %), confirming that carbon dominates with 79.6% for PANI and 49.5% for PANI/Fe. The surface chemistry of PANI was characterized by the occurrence of surface functional groups and heteroatoms, such as N and O. The corresponding EDS elemental mapping for C, N, O, S, and Fe in PANI/Fe are shown in FIG. 4C-4G. As depicted, a consistent dispersion of the elements within PANI/Fe can be seen, highlighting the significant impact of this consistency on the electrochemical performance.

Figure 5A:
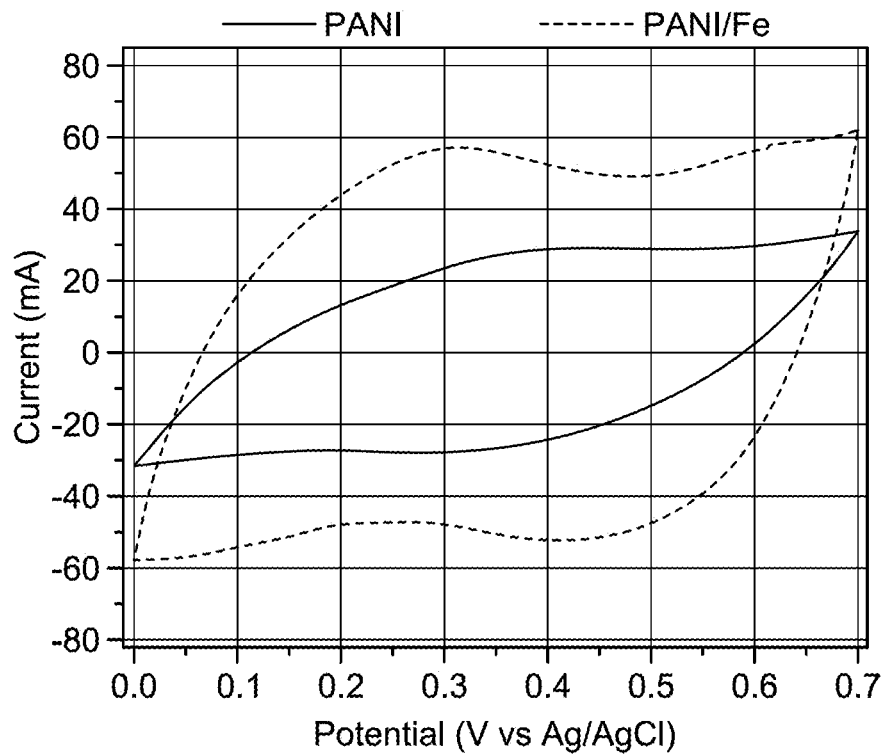
FIG. 5A shows cyclic voltammetry (CV) curves for PANI and PANI/Fe nanocomposite at a scan rate of 50 millivolts per second (mV/s), according to certain embodiments.
Figure 5B:
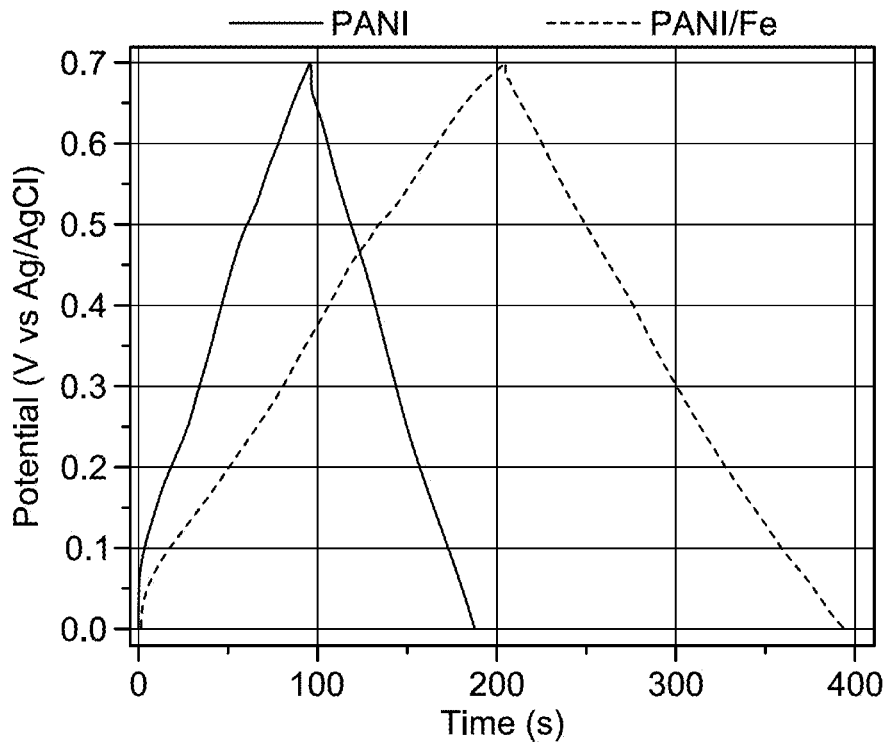
FIG. 5B shows galvanostatic charge-discharge (GCD) profiles for PANI and PANI/Fe nanocomposite at a current density of 1 ampere per gram ($Ag^{-1}$), according to certain embodiments.
Figure 5C:
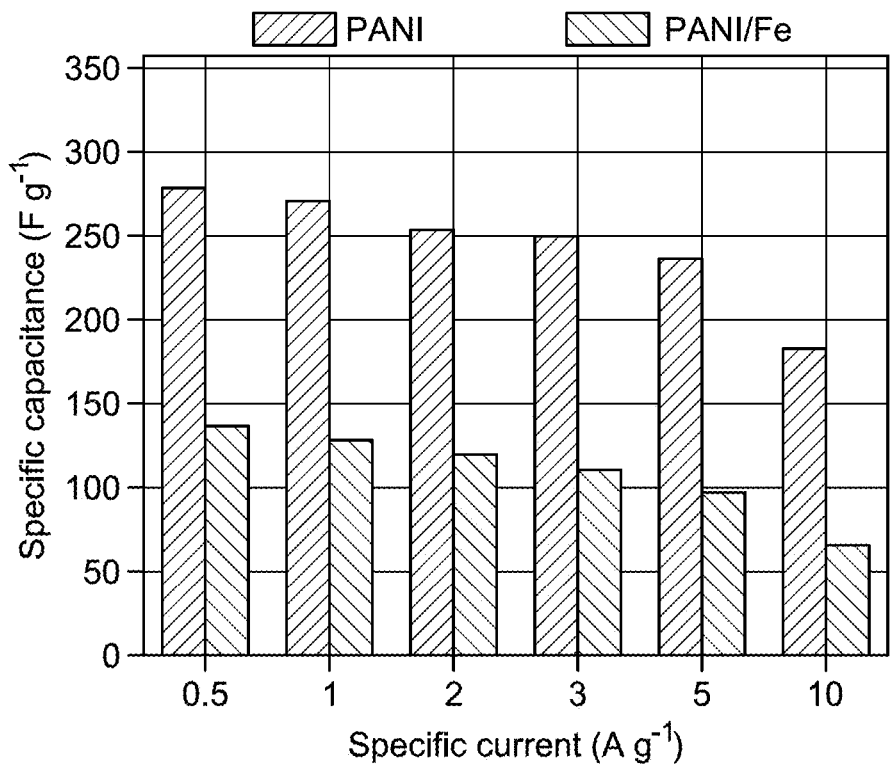
FIG. 5C depicts a column graph of specific capacitance calculated for PANI and PANI/Fe nanocomposite at various specific currents, according to certain embodiments.

The evaluation of electrode performance for supercapacitors, using PANI and PANI/Fe composites, was performed through electrochemical techniques in a half-cell setup. The investigations were carried out within an optimal operating voltage range of from 0 V to 0.7 V vs. Ag/AgCl, with an aqueous electrolyte of 1 M $H_2SO_4$. At a scan rate of 50 mV/s, the CV profiles for PANI and PANI/Fe are shown in FIG. 5A. The curves showed no noticeable redox peaks, similar to a double-layer feature, indicating a pseudocapacitive performance, which is a PANI signature. The CV of PANI/Fe showed a much higher current response and wider area compared to pure PANI, demonstrating a better capacitive performance of the PANI/Fe electrode. This may be attributed to the fact that Fe synergized well with PANI, resulting in an increased electrode conductivity, as evidenced by the smaller and almost negligible iR drop of PANI/Fe compared to PANI. At a current density of 1 ampere per gram ($Ag^{-1}$), the GCD curves of PANI and PANI/Fe were compared, as shown in FIG. 5B. The GCD shows almost linear shapes, in full agreement with the CV, as shown in FIG. 5A. PANI/Fe has a longer discharge time than pure PANI, which aligned with the CV curves. The incorporation of Fe cations into the PANI matrix enhanced its electrical conductivity, this led to an enhanced current response in CV and extended discharge times in GCD for PANI/Fe compared to PANI alone. Additionally, Fe incorporation improved the ions collection ability of PANI/Fe, thereby facilitating ion mobility within the electrode materials. This is depicted in FIG. 5C, which illustrates specific capacitance values of PANI and PANI/Fe at various specific currents, calculated using Equation (1). Pure PANI exhibited capacitance values of 137.7 $Fg^{-1}$, 129.3 $Fg^{-1}$, 119.7 $Fg^{-1}$, 110.8 $Fg^{-1}$, 98.1 $Fg^{-1}$, and 66.4 $Fg^{-1}$ at specific currents of 0.5 $Ag^{-1}$, 1 $Ag^{-1}$, 2 $Ag^{-1}$, 3 $Ag^{-1}$, 5 $Ag^{-1}$, and 10 $Ag^{-1}$, respectively. In contrast, PANI/Fe showed capacitance values of 278.7 $Fg^{-1}$, 269.4 $Fg^{-1}$, 252.6 $Fg^{-1}$, 249.4 $Fg^{-1}$, 236.5 $Fg^{-1}$, and 182.7 $Fg^{-1}$ at the same currents, indicating a significant enhancement in capacitance values with the incorporation of Fe into PANI. The Nyquist plot illustrates a comparison between PANI and PANI/Fe, shown in FIG. 5D. The intercepts with the Z'-axis revealed values of 2.1Ω for PANI and 2.01Ω for PANI/Fe, indicating nearly identical equivalent series resistances (ESR) for PANI and PANI/Fe. However, there were notable differences in the charge transfer resistance (RC) values between them. This enhancement demonstrates how Fe significantly affects the electrochemical performance of PANI/Fe. Consequently, an extensive electrochemical analysis of PANI/Fe was necessary.

Figure 5D:
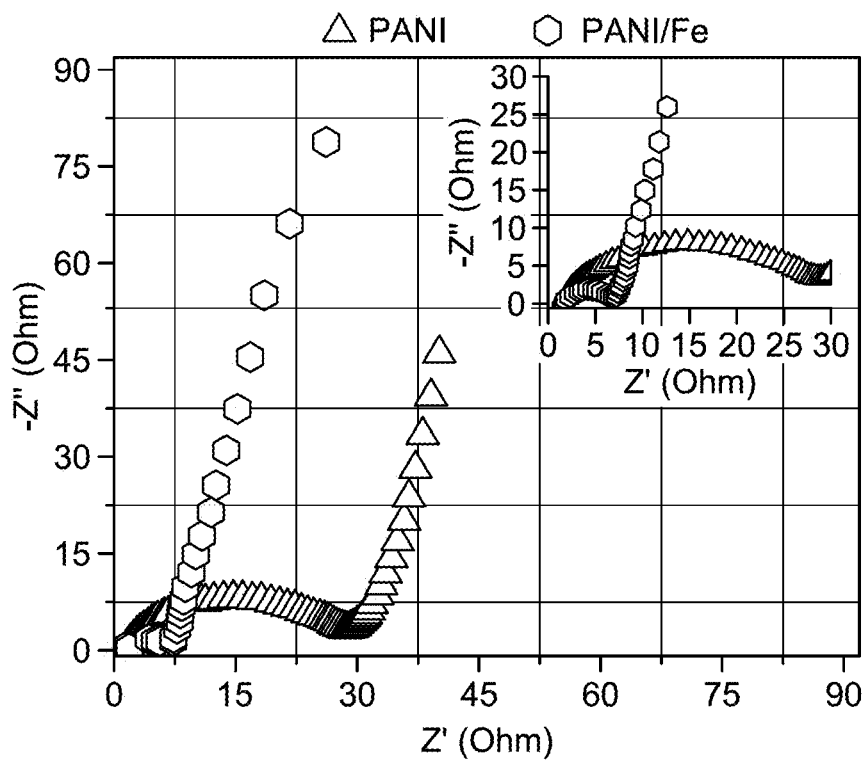
FIG. 5D is a Nyquist plot of PANI and PANI/Fe illustrating impedance characteristics, according to certain embodiments.
Figure 5E:
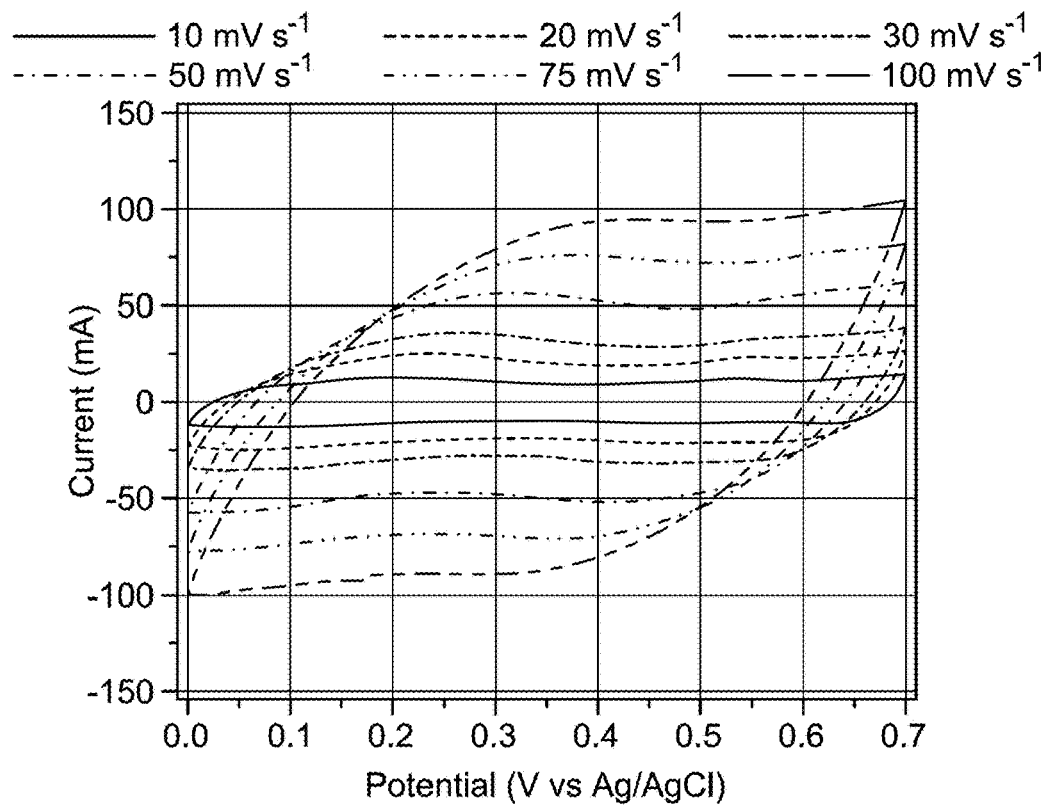
FIG. 5E is a cyclic voltammetry (CV) curve of PANI/Fe nanocomposite at diverse scan rates, according to certain embodiments.
Figure 5F:
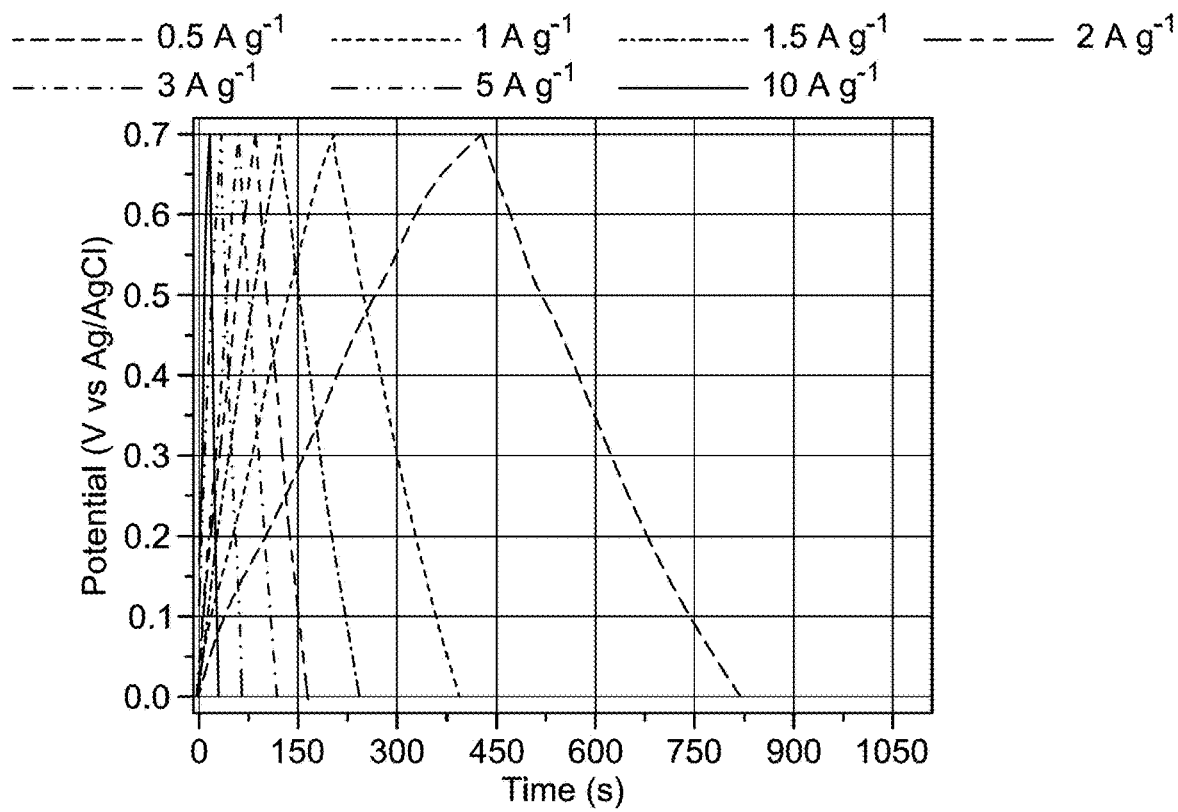
FIG. 5F shows galvanostatic charge-discharge (GCD) profiles of PANI/Fe nanocomposite at varied specific currents, highlighting their performance under different operational conditions, according to certain embodiments.

With a constant potential of 0.7 V vs. Ag/AgCl, the CV curves of PANI/Fe, as shown in FIG. 5E, were acquired at various scan speeds ranging from 10 mV/s to 100 mV/s. The quasi-rectangular CV pattern indicated energy storage through a pseudocapacitive mechanism, devoid of discernible oxidation or reduction peaks. Notably, as the scan rate escalates, two key observations emerge: firstly, the current response escalates owing to the diffusion rate surpassing the reaction rate at higher scan rates; and, secondly, the quasi-rectangular CV shapes persist due to the electrode materials' reversibility. The GCD graph of PANI/Fe at a constant potential of 0.7 V vs. Ag/AgCl, as a function of current density varying from 0.5 $Ag^{-1}$ to 10 $Ag^{-1}$, is shown in FIG. 5F. The CV curves are in agreement with the linear connection between potential and time in the GCD forms, as shown in FIG. 5D.

Figure 6A:
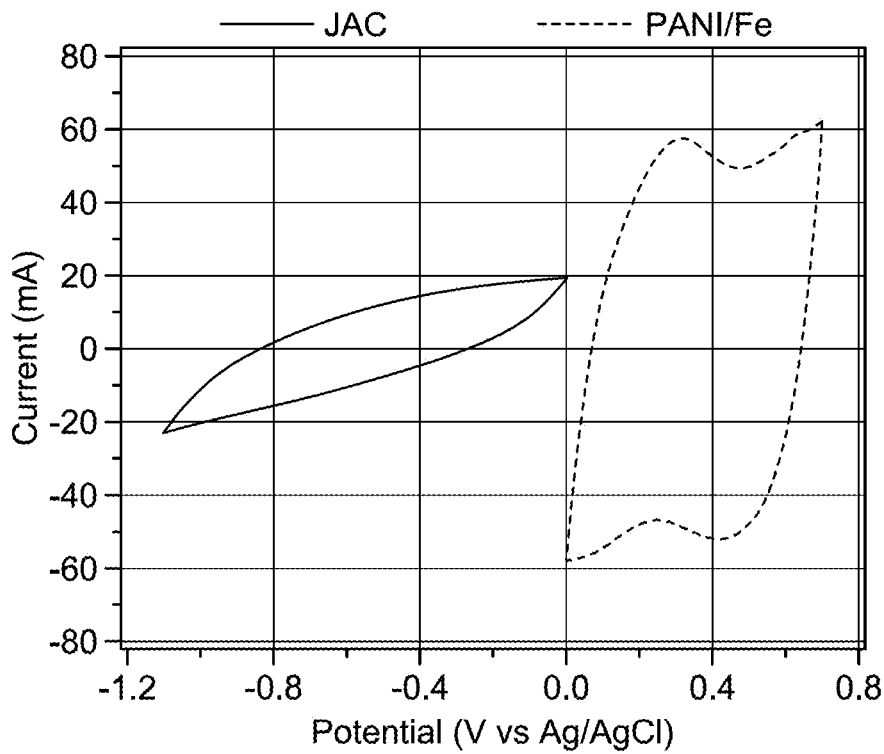
FIG. 6A illustrates cyclic voltammetry (CV) curves for PANI/Fe nanocomposite and jute activated carbon (JAC) recorded at a 50 mV/s scan rate, according to certain embodiments.

To broaden the applications of the material, a hybrid supercapacitor was developed, featuring a combination of PANI/Fe as the positive electrode, while for the negative electrode Jute Activated Carbon (JAC) was employed. Detailed electrochemical analysis and comprehensive characterization of JAC are discussed in our earlier publications [See: S. S. Shah and researchers, *Jute sticks derived and commercially available activated carbons for symmetric supercapacitors with bio-electrolyte: a comparative study*, Synth. Met. 277 (2021) 116765, the disclosure of which is incoroporated herein by reference in its entirety]. As shown in FIG. 6A, JAC operates within an operating potential window (OPW) of −1.1 V to 0.0 V vs. Ag/AgCl, whereas PANI/Fe operates from 0.0 V to 0.7 V vs. Ag/AgCl. To ensure a balanced charge distribution between the negative and positive electrodes during charging and discharging, a specific charge balance formula (Equation 3, above) was employed. This procedure was essential because of the distinct OPW and current reactions of JAC and PANI/Fe.

Figure 6B:
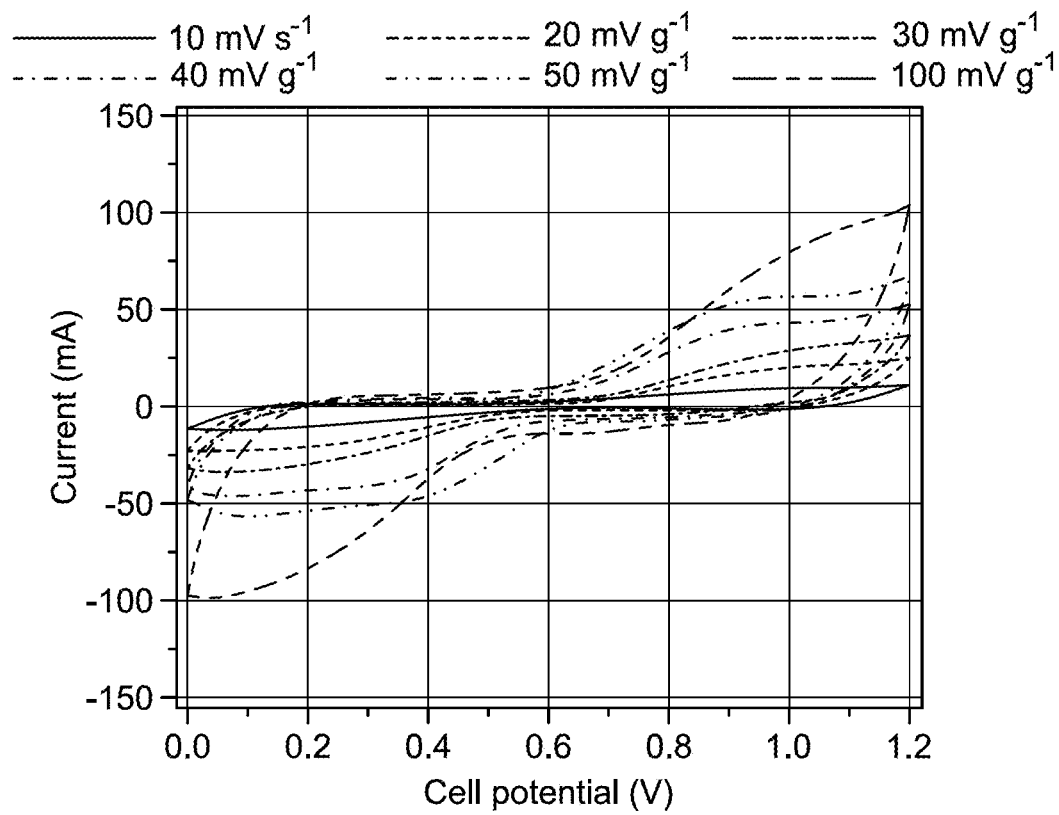
FIG. 6B shows cyclic voltammetry (CV) profiles of the PANI/Fe//JAC hybrid device across varying scan rates, according to certain embodiments.
Figure 6C:
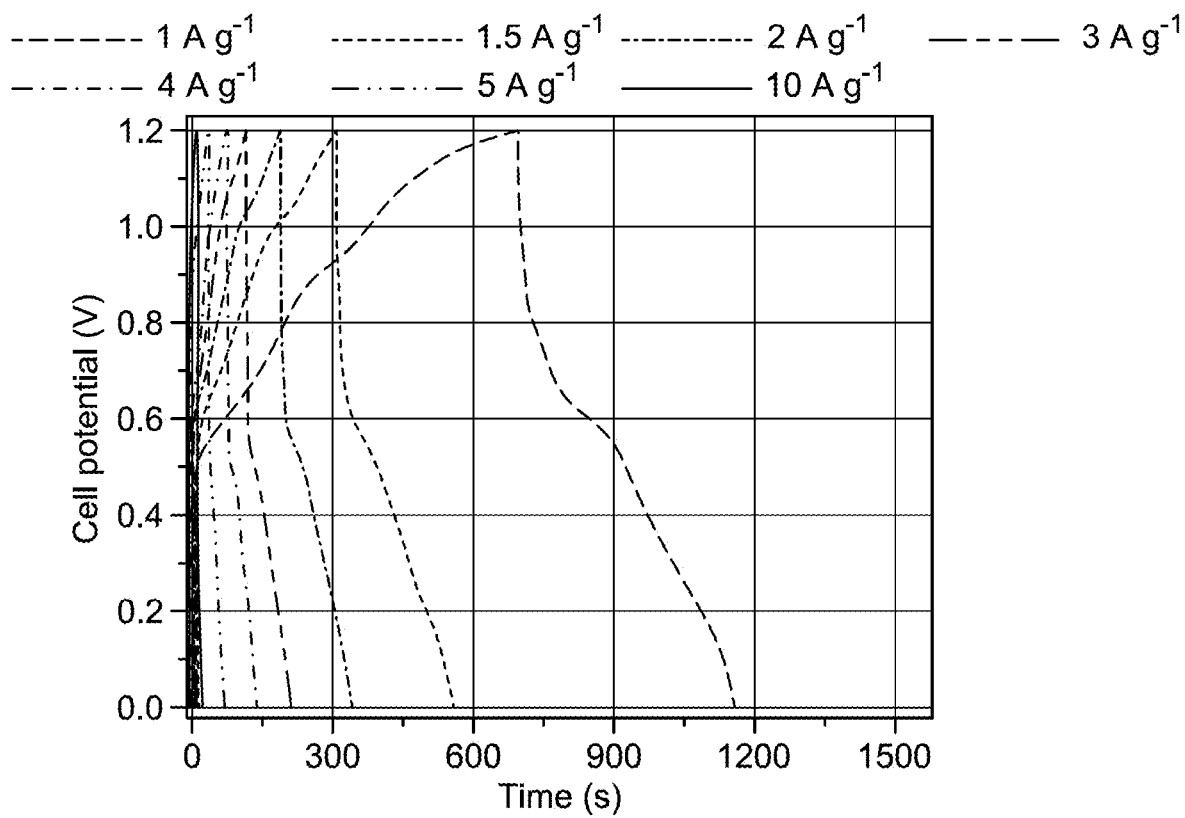
FIG. 6C shows galvanostatic charge-discharge (GCD) curves of the PANI/Fe//JAC hybrid supercapacitor at various specific currents, according to certain embodiments.

The CV curves of the hybrid supercapacitor device consisting of PANI/Fe and JAC electrodes is shown in FIG. 6B. The curves were recorded across numerous scan rates, spanning from 10 mV/s to 100 mV/s. The operational potential range of the device was set between 0.0 V and 1.2 V. Although there was an expectation for the PANI/Fe//JAC hybrid supercapacitor device to utilize the combined potential of both electrodes, its voltage was limited to a maximum of 1.2 V because of the decomposition potential of water, as shown in FIG. 6B. According to the CV profile, the hybrid supercapacitor device shows a pseudocapacitive behavior, with two distinct peaks appearing at approximately 0.3 V and 0.9 V. The redox peaks are considered to originate from the transition between PANI's pernigraniline, emeraldine, and leucoemeraldine states. With increasing scan rates, the current in both positive and negative directions escalated, signifying ion diffusion's influence on the device's pseudocapacitive reaction. As shown in FIG. 6C, GCD curves of a hybrid supercapacitor device constructed from PANI/Fe//JAC are presented at various specific currents including 1 $Ag^{-1}$, 1.5 $Ag^{-1}$, 2 $Ag^{-1}$, 3 $Ag^{-1}$, 4 $Ag^{-1}$, 5 $Ag^{-1}$, and 10 $Ag^{-1}$ within an OPW of 0.0 V to 1.2 V. These curves demonstrate a non-linear relationship between time and voltage, aligning with the pseudocapacitive nature observed in the CV, as shown in FIG. 6B.

Figure 6D:
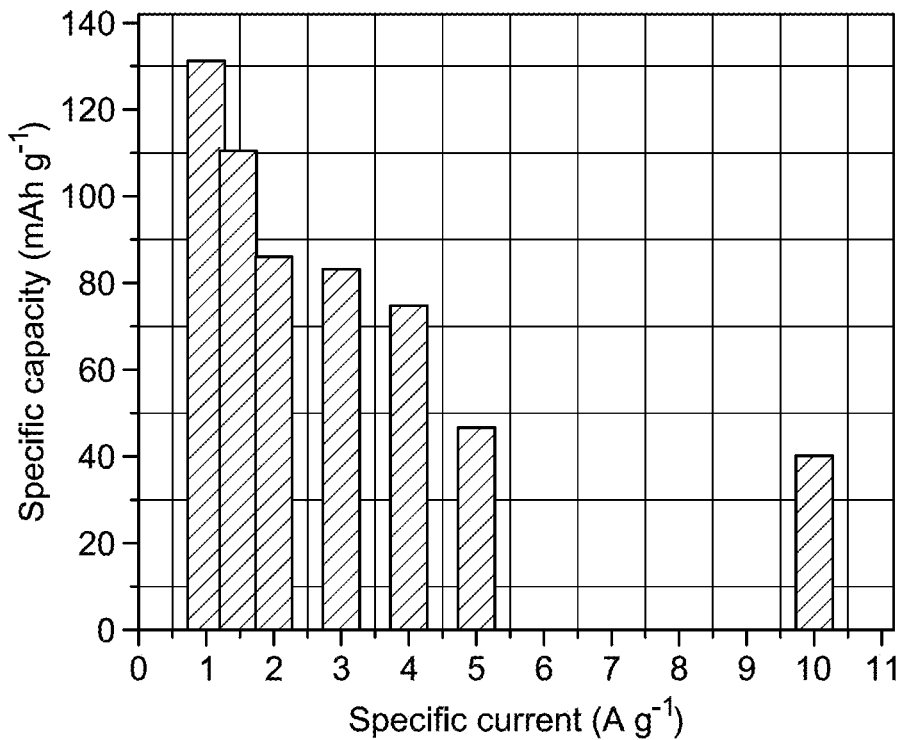
FIG. 6D depicts calculated specific capacities of the PANI/Fe//JAC hybrid supercapacitor at different specific currents, according to certain embodiments.

Consequently, specific capacity calculation is deemed more reliable than specific capacitance measurement. The specific capacity values of the PANI/Fe//JAC hybrid supercapacitor device were derived from the GCD curves, revealing values of 131.2 $mAhg^{-1}$, 110.8 $mAhg^{-1}$, 86.5 $mAhg^{-1}$, 83.1 $mAhg^{-1}$, 74.7 $mAhg^{-1}$, 46.7 $mAhg^{-1}$, and 40.3 $mAhg^{-1}$ at 1 $Ag^{-1}$, 1.5 $Ag^{-1}$, 2 $Ag^{-1}$, 3 $Ag^{-1}$, 4 $Ag^{-1}$, 5 $Ag^{-1}$, and 10 $Ag^{-1}$ current densities, respectively, as shown in FIG. 6D.

Figure 6E:
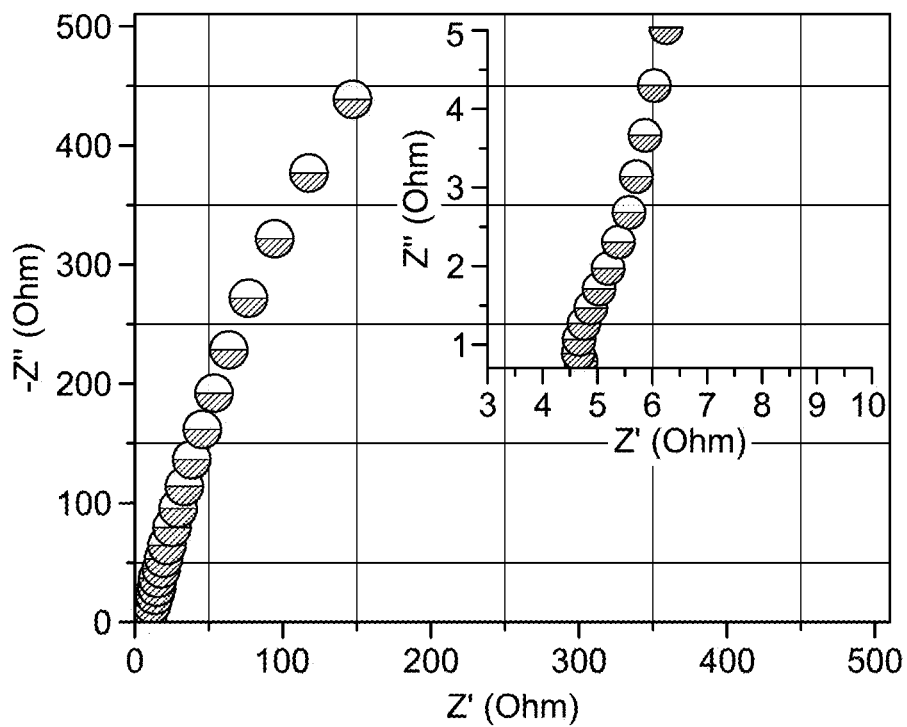
FIG. 6E is a Nyquist plot of the PANI/Fe//JAC hybrid supercapacitor illustrating impedance characteristics, according to certain embodiments.

In FIG. 6E, a Nyquist plot of the PANI/Fe//JAC hybrid supercapacitor device is presented, which shows a nearly vertical line to the −Z'-axis. This gives an excellent indication of the electrical conductivity of the device. The Equivalent Series Resistance (ESR) of the device was estimated to be 4.752, as can be depicted from the inset to FIG. 6E.

Figure 6F:
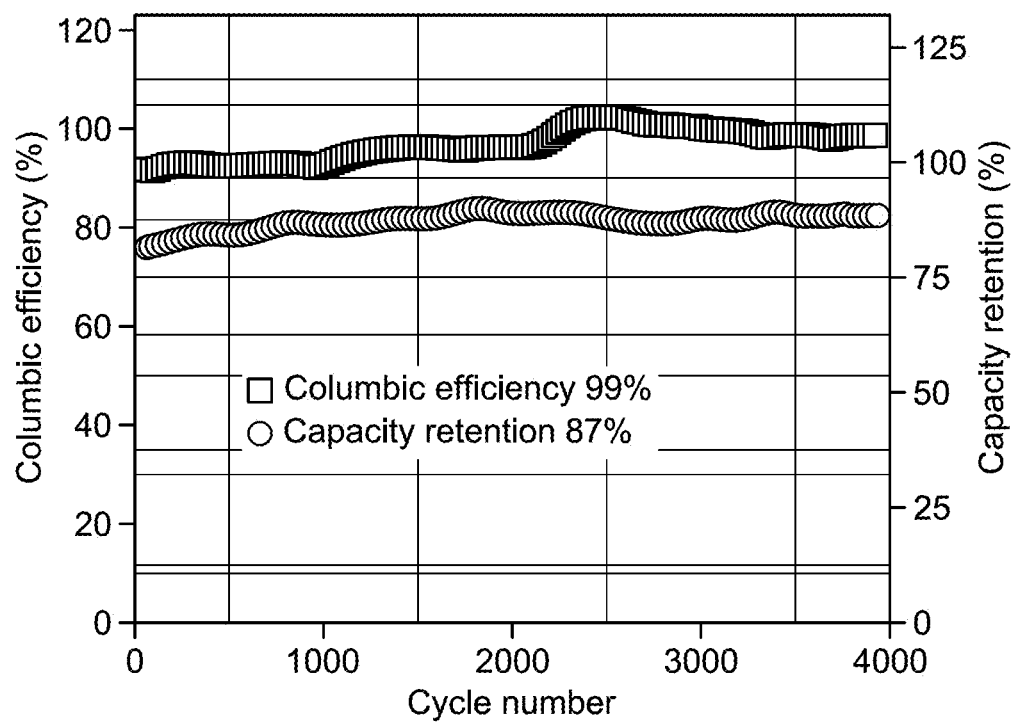
FIG. 6F is a long-term stability performance graph of the PANI/Fe//JAC hybrid device, according to certain embodiments.

The stability performance of the PANI/Fe//JAC hybrid supercapacitor over 4000 GCD cycles, focusing on coulombic efficiency and capacity retention, is shown in FIG. 6F. The Coulombic efficiency remains consistently high at an average of 99%, demonstrating minimal energy loss and excellent reversibility of the electrochemical reactions within the device. The capacity retention starts at 100% and gradually decreases to 87% by the end of the cycling period. This decline is typical and may be attributed to the degradation of electrode materials and other operational stresses, yet retaining 87% capacity after 4000 cycles indicates the robustness and longevity of the PANI/Fe//JAC electrode materials. These electrochemical parameters demonstrate the efficiency and longevity of the hybrid supercapacitor, drawing attention to its possible commercial use in high-tech energy storage devices.

Figure 7:
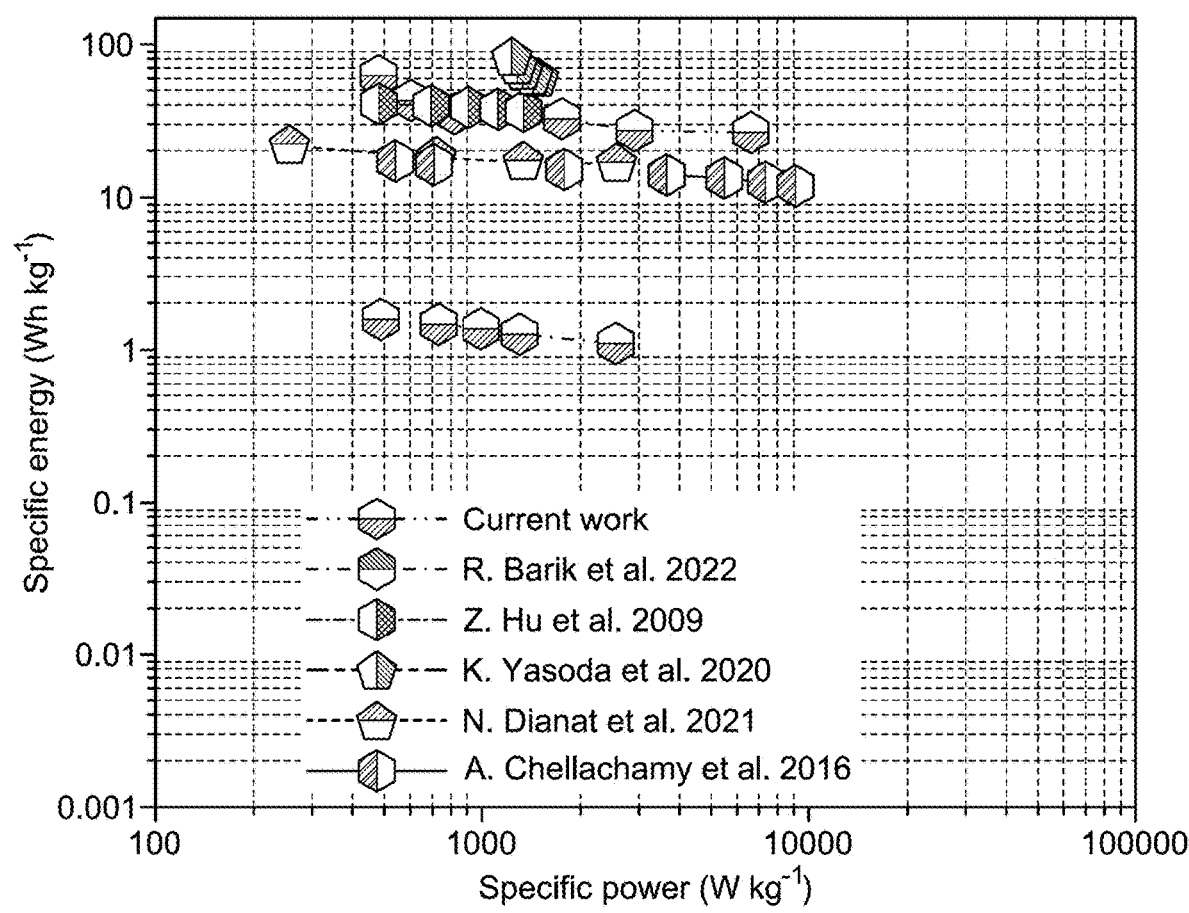
FIG. 7 shows comparative Ragone plots of PANI/Fe//JAC hybrid supercapacitor device and some PANI-based supercapacitor devices, according to certain embodiments.

This hybrid device's specific energy and specific power values were compared to those of recently disclosed PANI-based supercapacitor devices [29,43-47], as shown in FIG. 7. The hybrid supercapacitor device, including PANI/Fe//JAC, demonstrated outstanding performance. The highest specific energy attained was 62.9 Whkg$^{-1}$ (or 479.5 Wkg$^{-1}$ at 1 Ag$^{-1}$), while the highest specific power it produced was 6600.1 Wkg$^{-1}$ (or 26.6 Whkg$^{-1}$ at 10 Ag$^{-1}$). The hybrid device was able to function at an increased cell potential of 1.2 V due to the synergistic action of PANI with Fe-cations and the selected electrolyte. The current hybrid supercapacitor device outperforms similarly recently reported supercapacitor devices in the literature, and these results are comparable to polyaniline-based supercapacitor devices on a wider scale. A detailed comparison based on some crucial metrics, such as specific current, electrolyte and voltage range are listed in Table 1 herein below.

Z. A. Hu and researchers, *Polyaniline/SnO$_2$ nanocomposite for supercapacitor applications*, Mater. Chem. Phys. 114 (2009) 990-995, the disclosure of which is incorporated herein by reference in its entirety.

R. Barik and researchers, *Supercapacitor performance and charge storage mechanism of brannerite type CuV$_2$O6/PANI nanocomposites synthesis with their theoretical aspects*, Electrochim. Acta. 410 (2022) 140015, the disclosure of which is incorporated herein by reference in its entirety.

K. Y. Yasoda and researchers, *Polyaniline decorated manganese oxide nanoflakes coated graphene oxide as a hybrid-supercapacitor for high performance energy storage application*, Ionics (Kiel). 26 (2020) 2493-2500, the disclosure of which is incorporated herein by reference in its entirety.

N. Dianat and researchers, *Polyaniline-Lignin Interpenetrating Network for Supercapacitive*, Nano Lett. 21 (2021) 9485-9493, the disclosure of which is incorporated herein by reference in its entirety.

A. Chellachamy Anbalagan and researchers, *Brine solution-driven synthesis of porous polyaniline for supercapacitor electrode application*, Polymer (Guildf). 87 (2016) 129-137, the disclosure of which is incorporated herein by reference in its entirety.

W. Luo and researchers, *Fabrication of Ti$_3$C$_2$Tx MXene/polyaniline composite films with adjustable thickness for high-performance flexible all-solid-state symmetric supercapacitors*, Electrochim. Acta. 406 (2022) 139871, the disclosure of which is incorporated herein by reference in its entirety.

Table 1: Electrochemical metrics of PANI/Fe//JAC hybrid device compared to some other polyaniline-based supercapacitor devices from the literature.

TABLE 1

Electrochemical metrics of PANI/Fe//JAC hybrid device compared to some other polyaniline-based supercapacitor devices from the literature.

| SCs Device | Electrolyte (M) | Voltage (V) | Capacitance (Fg$^{-1}$) @ Current density (Ag$^{-1}$) | Es (Whkg$^{-1}$) | Ps (Wkg$^{-1}$) | Stability | Ref. |
|---|---|---|---|---|---|---|---|
| PANI/MnxOy | H$_2$SO$_4$ (1) | −0.1 to 0.8 | 205.55 @ 10 mV/s | 21.9 | 1850 | 1500:90% | [1] |
| PANI: Fe | KOH (6) | 0 to 1 | 85 @ ... | 11.8 | 60 | 10000:... | [2] |
| CuV$_2$O$_6$/PANI | H$_2$SO$_4$ (1) | 0 to 0.8 | 375 @ 4 | 1.6 | 480 | 5000:76.8% | [3] |
| Mn$_3$O$_4$-GO-PANi | H$_2$SO$_4$ (1) | ... | 829 @ 0.3 | 60 | 1472 | 1800:94% | [4] |
| PANI:Ag | KOH (6) | 0 to 1 | 76 @ ... | 10.5 | 90 | 10000:... | [2] |
| GO/PANI/CuCo$_2$O$_4$ | KOH (1) | 0 to 1.2 | 313 @ 1 | 62.54 | 5997.61 | 5000:84% | [5] |
| PANI/CZTS | KOH (6) | 0 to 1 | 311 @ 0.1 | 43 | 440 | 10000:94% | [6] |
| G/PANI | H$_2$SO$_4$ (1) | 0 to 1 | 808 @ 1 | 28 | 250 | 10000:108% | [7] |
| PANI/CoFe$_2$O$_4$ | H$_2$SO$_4$ (0.1) | 0 to 1.2 | 249.04 @ 1 | 49.80 | 300.02 | ... | [8] |
| PANI/La-10 | H$_2$SO$_4$ (1) | 0 to 0.8 | 718 @ 1 | 56.1 | 400 | ... | [9] |
| PANI-MnO$_2$ | H$_2$SO$_4$ (1) | 0 to 0.8 | 417 @ 5 mV/s | 7.2 | 280 | 2000:96.4% | [10] |
| MXene/PANI | H$_2$SO$_4$ (1) | 0 to 1.2 | 272.5 @ 1 | 31.18 | 1079.3 | 4000:71.4 % | [11] |

TABLE 1-continued

Electrochemical metrics of PANI/Fe//JAC hybrid device compared to some other polyaniline-based supercapacitor devices from the literature.

| SCs Device | Electrolyte (M) | Voltage (V) | Capacitance ($Fg^{-1}$) @ Current density ($Ag^{-1}$) | Es ($Whkg^{-1}$) | Ps ($Wkg^{-1}$) | Stability | Ref. |
|---|---|---|---|---|---|---|---|
| PANI-lignosulfonate | $H_2SO_4$ (0.5) | 0 to 0.8 | 1200 @ 1 | 21.2 | 278.5 | 15000:87% | [12] |
| PANI/Fe//JAC | $H_2SO_4$ (1) | 0 to 1.2 | 131.17 $mAhg^{-1}$ @ | 62.9 | 479.5 | 4000:87% | This work |

[1] D.A.L. Almeida and researchers, Comparative synergistic effect of hybrid composites based polyaniline wrapped metallic oxides (Ni, Fe and Mn) and its capacitive performance as electrodes for supercapacitor, Electrochim. Acta. 472 (2023) 143369, the disclosure of which is incorporated herein by reference in its entirety.
[2] A. Güngör and researchers, Elevating superpacitor performance: Enhancing electrochemical efficiency with transition metal-doped polyaniline electrode, J. Energy Storage. 76 (2024) 110143, the disclosure of which is incorporated herein by reference in its entirety.
[3] R. Barik and researchers, Supercapacitor performance and charge storage mechanism of brannerite type $CuV_2O_6$/PANI nanocomposites synthesis with their theoretical aspects, Electrochim. Acta. 410 (2022) 140015, the disclosure of which is incorporated herein by reference in its entirety.
[4] R. Barik and researchers, Supercapacitor performance and charge storage mechanism of brannerite type $CuV_2O_6$/PANI nanocomposites synthesis with their theoretical aspects, Electrochim. Acta. 410 (2022) 140015, the disclosure of which is incorporated herein by reference in its entirety.
[5] S. Verma and researchers, Facile synthesis of graphene oxide-polyaniline-copper cobaltite (GO/PANI/$CuCO_2O_4$) hybrid nanocomposite for supercapacitor applications, Synth. Met. 286 (2022) 117036, the disclosure of which is incorporated herein by reference in its entirety.
[6] A. Güngör and researchers, Polyaniline:$Cu_2ZnSnS_4$ (PANI:CZTS) nanocomposites as electrodes in all-in-one supercapacitor devices, Electrochim. Acta. 480 (2024) 143924, the disclosure of which is incorporated herein by reference in its entirety.
[7] L. Zhang and researchers, Three-dimensional structures of graphene/polyaniline hybrid films constructed by steamed water for high-performance supercapacitors, J. Power Sources. 342 (2017) 1-8, the disclosure of which is incorporated herein by reference in its entirety.
[8] S. Verma and researchers, Nanoarchitectonics of GO/PANI/$CoFezO_4$ (Graphene Oxide/polyaniline/Cobalt Ferrite) based hybrid composite and its use in fabricating symmetric supercapacitor devices, J. Mol. Struct. 1266 (2022) 133515, the disclosure of which is incorporated herein by reference in its entirety.
[9] M. Morshed and researchers, Polyaniline and rare earth metal oxide composition: A distinctive design approach for supercapacitor, Electrochim. Acta. 370 (2021) 137714, the disclosure of which is incorporated herein by reference in its entirety.
[10] S.A. Jadhav and researchers, Polyaniline (PANI)-manganese dioxide ($MnO_2$) nanocomposites as efficient electrode materials for supercapacitors, Chem. Phys. Lett. 778 (2021) 138764, the disclosure of which is incorporated herein by reference in its entirety.
[11] W. Luo and researchers, Fabrication of $Ti_3C_2Tx$ MXene/polyaniline composite films with adjustable thickness for high-performance flexible all-solid-state symmetric supercapacitors, Electrochim. Acta. 406 (2022) 139871, the disclosure of which is incorporated herein by reference in its entirety.
[12] N. Dianat and researchers, Polyaniline-Lignin Interpenetrating Network for Supercapacitive Energy Storage, Nano Lett. 21 (2021) 9485-9493, the disclosure of which is incorporated herein by reference in its entirety.

[1] D. A. L. Almeida and researchers, *Comparative synergistic effect of hybrid composites based polyaniline wrapped metallic oxides (Ni, Fe and Mn) and its capacitive performance as electrodes for supercapacitor*, Electrochim. Acta. 472 (2023) 143369, the disclosure of which is incorporated herein by reference in its entirety.
[2] A. Güngör and researchers, *Elevating superpacitor performance: Enhancing electrochemical efficiency with transition metal-doped polyaniline electrode*, J. Energy Storage. 76 (2024) 110143, the disclosure of which is incorporated herein by reference in its entirety.
[3] R. Barik and researchers, *Supercapacitor performance and charge storage mechanism of brannerite type CuV2O6/PANI nanocomposites synthesis with their theoretical aspects*, Electrochim. Acta. 410 (2022) 140015, the disclosure of which is incorporated herein by reference in its entirety.
[4] R. Barik and researchers, *Supercapacitor performance and charge storage mechanism of brannerite type CuV2O6/PANI nanocomposites synthesis with their theoretical aspects*, Electrochim. Acta. 410 (2022) 140015, the disclosure of which is incorporated herein by reference in its entirety.
[5] S. Verma and researchers, *Facile synthesis of graphene oxide-polyaniline-copper cobaltite (GO/PANI/CuCo2O4) hybrid nanocomposite for supercapacitor applications*, Synth. Met. 286 (2022) 117036, the disclosure of which is incorporated herein by reference in its entirety.
[6] A. Güngör and researchers, *Polyaniline: CuzZnSnS4 (PANI: CZTS) nanocomposites as electrodes in all-in-one supercapacitor devices*, Electrochim. Acta. 480 (2024) 143924, the disclosure of which is incorporated herein by reference in its entirety.
[7] L. Zhang and researchers, *Three-dimensional structures of graphene/polyaniline hybrid films constructed by steamed water for high-performance supercapacitors*, J. Power Sources. 342 (2017) 1-8, the disclosure of which is incorporated herein by reference in its entirety.
[8] S. Verma and researchers, *Nanoarchitectonics of GO/PANI/CoFe204 (Graphene Oxide/polyaniline/Cobalt Ferrite) based hybrid composite and its use in fabricating symmetric supercapacitor devices*, J. Mol. Struct. 1266 (2022) 133515, the disclosure of which is incorporated herein by reference in its entirety.
[9] M. Morshed and researchers, *Polyaniline and rare earth metal oxide composition: A distinctive design approach for supercapacitor*, Electrochim. Acta. 370 (2021) 137714, the disclosure of which is incorporated herein by reference in its entirety.
[10] S. A. Jadhav and researchers, *Polyaniline (PANI)-manganese dioxide (MnO2) nanocomposites as efficient electrode materials for supercapacitors*, Chem. Phys. Lett. 778 (2021) 138764, the disclosure of which is incorporated herein by reference in its entirety.
[11] W. Luo and researchers, *Fabrication of Ti3C2Tx MXene/polyaniline composite films with adjustable thickness for high-performance flexible all-solid-state symmetric supercapacitors*, Electrochim. Acta. 406 (2022) 139871, the disclosure of which is incorporated herein by reference in its entirety.
[12] N. Dianat and researchers, *Polyaniline-Lignin Interpenetrating Network for Supercapacitive Energy Storage*, Nano Lett. 21 (2021) 9485-9493, the disclosure of which is incorporated herein by reference in its entirety.

To conclude, hybrid supercapacitors have the potential to be very useful in the realm of energy storage. In the present disclosure, electrodeposition was used to fabricate PANI and PANI/Fe, and then their electrochemical performances were independently evaluated as electrodes of a supercapacitor. Numerous analytical methods were utilized to investigate the materials comprehensively, including XRD, FTIR, FESEM, and EDX. The electrochemical characteristics were examined and evaluated in both 3-electrode and 2-electrode systems. The working electrodes in the three-electrode setup were PANI and PANI/Fe; the reference electrodes utilized throughout the experiment were Ag/AgCl; and, the counter electrodes were platinum wire. Electrochemical experiments were conducted with a 1 M $H_2SO_4$ electrolyte throughout a potential range of 0 V to 0.7 V. With a current density of 0.5 $Ag^{-1}$, PANI achieved a high specific capacitance of 137.7 $Fg^{-1}$. The PANI/Fe composite, however, has a superior and exceptional capacitance of 278.7 $Fg^{-1}$. The development of a hybrid supercapacitor was based on these discoveries.

The examined supercapacitor was produced using a positive electrode made of PANI/Fe and a negative electrode derived from jute stick activated carbon (JAC). A voltage window ranging from 0 V to 1.2 V was the optimal operating range for the gadget. In addition to displaying non-linear charge-discharge curves, the PANI/Fe//JAC supercapacitor demonstrated pseudocapacitive behavior. It showed a power density of 479.5 $Wkg^{-1}$, an energy density of 62.9 $Whkg^{-1}$, and a specific capacity of 131.2 $mAhg^{-1}$ at a current density of 1 $Ag^{-1}$. While the energy density was 26.6 $Whkg^{-1}$, the power density peaked at 6600.1 $Wkg^{-1}$ with a current density of 10 $Ag^{-1}$. After 4,000 cycles of charging and discharging at 10 $Ag^{-1}$, 87% of the device's original capacity remained. The present disclosure demonstrated that both the PANI/Fe composite and the PANI/Fe//JAC hybrid supercapacitor cell hold significant potential as effective materials for advancing future energy storage technologies.

Numerous modifications and variations of the present disclosure are possible in light of the above teachings. It is, therefore, to be understood that within the scope of the appended claims, the invention may be practiced otherwise than as specifically described herein.

The invention claimed is:

1. A hybrid supercapacitor comprising:
    an electrolyte;
    a carbon-based electrode including jute stick activated carbon; and,
    a pseudocapacitive electrode,
wherein the pseudocapacitive electrode comprises:
    a first metallic substrate; and,
    a composite material disposed on the first metallic substrate, the composite material comprising a matrix of polyaniline in which are dispersed clustered nanorods of iron oxide (a-$Fe_2O_3$),
    further wherein:
    the polyaniline comprises an orthorhombic $C_6H_7N$ phase, as determined by X-ray diffraction; and,
    the nanorods of a-$Fe_2O_3$ have a median volume particle size (Dv50) of from about 10 to about 1000 nanometers (nm), as determined by Scanning Electron Microscopic (SEM) analysis.

2. The hybrid supercapacitor according to claim 1, wherein the jute stick activated carbon has an operational potential window of from about −1.1 to about 0.0 V versus an silver/silver chloride (Ag/AgCl) reference electrode.

3. The hybrid supercapacitor according to claim 1, wherein the first metallic substrate comprises a stainless-steel mesh.

4. The hybrid supercapacitor according to claim 1, wherein the composite material is disposed on the first metallic substrate at a substantially uniform thickness.

5. The hybrid supercapacitor according to claim 1, wherein the matrix of polyaniline has a porous sponge-like morphology, as determined by field emission scanning electron microscopy (FESEM).

6. The hybrid supercapacitor according to claim 1, wherein the nanorods of a-$Fe_2O_3$ have a median volume particle size (Dv50) of from about 100 to about 1000 nm, as determined by scanning electron microscopic (SEM) analysis.

7. The hybrid supercapacitor according to claim 1, wherein the pseudocapacitive electrode has a specific capacitance of from about 150 to about 300 Farad per gram ($Fg^{-1}$), as determined at a specific current of from about 0.5 to about 10 amperes per gram ($Ag^{-1}$).

8. The hybrid supercapacitor according to claim 1, wherein the pseudocapacitive electrode has a specific capacitance of from about 175 to about 300 $Fg^{-1}$ as determined at a specific current of from about 0.5 to about 10 $Ag^{-1}$.

9. The hybrid supercapacitor according to claim 1, wherein the pseudocapacitive electrode has a charge transfer resistance (RCT) of from about 5 to about 15 ohms ((2).

10. The hybrid supercapacitor according to claim 1, wherein the pseudocapacitive electrode has a charge transfer resistance (RCT) of from about 5 to about 10 ohms ((2).

11. The hybrid supercapacitor according to claim 1 having, as determined at a specific current of about 1 $Ag^{-1}$, a specific capacity of at least about 100 milliampere-hour per gram ($mAhg^{-1}$).

12. The hybrid supercapacitor according to claim 1 having, as determined at a specific current of about 1 $Ag^{-1}$, a specific capacity of at least about 125 $mAhg^{-1}$.

13. The hybrid supercapacitor according to claim 1 having, as determined at a specific current of about 1 $Ag^{-1}$, a specific energy of at least about 40 watt-hour per kilogram ($Whkg^{-1}$).

14. The hybrid supercapacitor according to claim 1 having, as determined at a specific current of about 1 $Ag^{-1}$, a specific energy of at least about 60 $Whkg^{-1}$.

15. The hybrid supercapacitor according to claim 1 having, as determined at a specific current of about 1 $Ag^{-1}$, a specific power of at least about 400 watt per kilogram ($Wkg^{-1}$).

16. The hybrid supercapacitor according to claim 1 having, as determined at a specific current of about 1 $Ag^{-1}$, a specific power of at least about 450 $Wkg^{-1}$.

17. A method of preparing the pseudocapacitive electrode as defined in claim 1, the method comprising:
    preparing an electrolyte solution in an inert container by dissolving hydrated iron (III) nitrate ($Fe(NO_3)_3.9H_2O$) in an aqueous solution of sulfuric acid ($H_2SO_4$) and aniline, wherein the molar ratio of $H_2SO_4$ to aniline is greater than about 10:1;
    at least partially immersing an anode and a cathode into the contained electrolyte solution, wherein the anode includes the first metallic substrate; and,
    applying a potential difference between the anode and cathode for a duration sufficient to induce an electric current in the electrolyte solution, to electrochemically polymerize the aniline to form polyaniline and to electrodeposit the polyaniline and a-$Fe_2O_3$ on the immersed anode.

18. The method according to claim 17, wherein the molar ratio of $H_2SO_4$ to aniline is from about 50:1 to about 200:1.

19. The method according to claim 17, wherein the potential difference is applied using a triangular potential waveform.

20. The method according to claim 19, wherein the scan rate of the triangular potential waveform is from about 10 to about 100 millivolts per second (mV/s).

* * * * *